(12) United States Patent
Wakabayashi

(10) Patent No.: US 8,687,041 B2
(45) Date of Patent: Apr. 1, 2014

(54) STEREOSCOPIC PANORAMA IMAGE CREATING APPARATUS, STEREOSCOPIC PANORAMA IMAGE CREATING METHOD, STEREOSCOPIC PANORAMA IMAGE REPRODUCING APPARATUS, STEREOSCOPIC PANORAMA IMAGE REPRODUCING METHOD, AND RECORDING MEDIUM

(71) Applicant: FUJIFILM Corporation, Tokyo (JP)

(72) Inventor: Satoru Wakabayashi, Saitama (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/682,292

(22) Filed: Nov. 20, 2012

(65) Prior Publication Data

US 2013/0076856 A1  Mar. 28, 2013

Related U.S. Application Data

(63) Continuation of application No. PCT/JP2011/075672, filed on Nov. 8, 2011.

(30) Foreign Application Priority Data

Dec. 24, 2010 (JP) ................................. 2010-288409

(51) Int. Cl.
*H04N 5/232* (2006.01)

(52) U.S. Cl.
USPC .......................................................... 348/36

(58) Field of Classification Search
USPC .................................................... 348/36, 42
See application file for complete search history.

(56) References Cited

U.S. PATENT DOCUMENTS

| | | | |
|---|---|---|---|
| 6,023,588 A * | 2/2000 | Ray et al. ..................... | 396/20 |
| 2001/0020976 A1 | 9/2001 | Peleg et al. | |
| 2001/0038413 A1* | 11/2001 | Peleg et al. ................... | 348/36 |
| 2003/0048354 A1 | 3/2003 | Takemoto et al. | |
| 2004/0001138 A1* | 1/2004 | Weerashinghe et al. ....... | 348/36 |
| 2008/0298674 A1* | 12/2008 | Baker et al. ................... | 382/154 |
| 2010/0039504 A1 | 2/2010 | Takahashi et al. | |
| 2010/0302347 A1 | 12/2010 | Shikata | |

FOREIGN PATENT DOCUMENTS

| | | |
|---|---|---|
| EP | 2257046 A2 | 12/2010 |
| JP | 11-164325 A | 6/1999 |
| JP | 11-164326 A | 6/1999 |
| JP | 2003-169351 A | 6/2003 |

(Continued)

OTHER PUBLICATIONS

International Search Report in PCT/JP2011/075672 dated Jan. 24, 2012(English Translation Thereof).

*Primary Examiner* — Mehrdad Dastouri
*Assistant Examiner* — Mohammed Rahaman
(74) *Attorney, Agent, or Firm* — McGinn Intellectual Property Law Group, PLLC

(57) ABSTRACT

In a stereoscopic panorama image creating method according to an embodiment of the presently disclosed subject matter, a plurality of stereoscopic images formed of left images and right images continuously shot with a stereoscopic imaging apparatus 1 being moved in one direction, the left images of the stereoscopic images are synthesized together and the right images thereof are synthesized together to create a stereoscopic panorama image, corresponding points of the stereoscopic images are detected, an image shift amount for setting a parallax of each corresponding point at a predetermined value is calculated, and information about the corresponding point and the image shift amount are recorded in association with the stereoscopic panorama image.

38 Claims, 12 Drawing Sheets

(56) References Cited

FOREIGN PATENT DOCUMENTS

| | | |
|---|---|---|
| JP | 2003-524927 A | 8/2003 |
| JP | 2005-073013 A | 3/2005 |
| JP | 2009-103980 A | 5/2009 |
| JP | 2010-045584 A | 2/2010 |
| JP | 2010-278587 A | 12/2010 |
| WO | WO 00/39995 A2 | 7/2000 |

* cited by examiner

PANORAMA SYNTHESIS

DETERMINE TRIMMING REGION

TRIM AND STORE AS 3D PANORAMA IMAGE

FIG.5

| 3D IMAGE NUMBER | CP COORDINATES ON PANORAMA IMAGE (LEFT IMAGE) | CP AMOUNT (IMAGE SHIFT AMOUNT) |
|---|---|---|
| 1 | (x1, y1) | $\Delta x1$ |
| 2 | (x2, y2) | $\Delta x2$ |
| 3 | (x3, y3) | $\Delta x3$ |
| . | . | . |
| . | . | . |
| . | . | . |

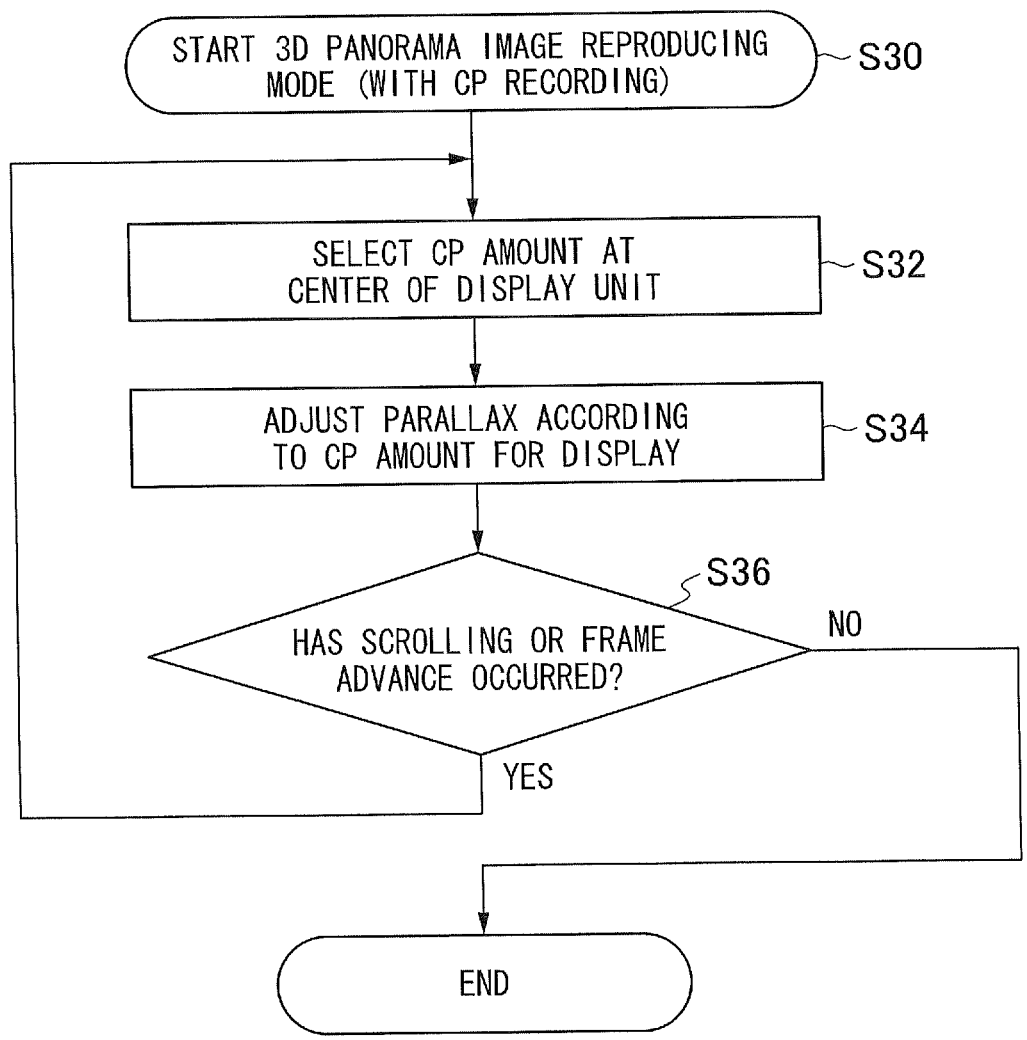

1st shot

1st shot   2nd shot   3rd shot

OVERLAPPING PARTS BETWEEN IMAGES

_US 8,687,041 B2_

STEREOSCOPIC PANORAMA IMAGE CREATING APPARATUS, STEREOSCOPIC PANORAMA IMAGE CREATING METHOD, STEREOSCOPIC PANORAMA IMAGE REPRODUCING APPARATUS, STEREOSCOPIC PANORAMA IMAGE REPRODUCING METHOD, AND RECORDING MEDIUM

CROSS-REFERENCE TO RELATED APPLICATIONS

This application is a PCT Bypass continuation application and claims the priority benefit under 35 U.S.C. §120 of PCT Application No. PCT/JP2011/075672 filed on Nov. 8, 2011 which application designates the U.S., and also claims the priority benefit under 35 U.S.C. §119 of Japanese Patent Application No. 2010-288409 filed on Dec. 24, 2010, which applications are all hereby incorporated in their entireties by reference.

BACKGROUND OF THE INVENTION

1. Field of the Invention

The presently disclosed subject matter relates to a stereoscopic panorama image creating apparatus, method and program, stereoscopic panorama image reproducing apparatus, method and program, and recording medium, and, in particular, to a stereoscopic panorama image creating apparatus, method and program of creating a stereoscopic panorama image based on a plurality of stereoscopic images shot by panning a stereoscopic imaging apparatus and a stereoscopic panorama image reproducing apparatus, method and program of reproducing a stereoscopic panorama image by scrolling or frame advance, and recording medium.

2. Description of the Related Art

Conventionally, a panorama synthesizing method has been known in which continuous shooting is performed with a video camera fixed to a tripod or the like for rotating it, and slit images cut out from images obtained by this continuous shooting into strip shapes are coupled together to synthesize panorama images (Japanese Patent Application Laid-Open No. 11-164325).

Japanese Patent Application Laid-Open No. 2003-169351 describes adjustment of a parallax in an image for stereoscopic viewing, but this adjustment adjusts a positional relation between a parallax barrier and a pixel of the image for stereoscopic viewing in a parallax-barrier-type viewer.

In a stereoscopic image display apparatus described in Japanese Patent Application Laid-Open No. 2005-073013, when information for adjusting a parallax amount in a stereoscopic image is inputted, the image is magnified or reduced based on that inputted information, thereby changing the parallax amount of the stereoscopic image.

In a stereoscopic image correcting apparatus described in Japanese Patent Application Laid-Open No. 2010-045584, a parallax amount between a left eye image and a right eye image configuring a stereoscopic image is detected, and this parallax amount is adjusted to control a pop-up amount and a receding amount of the stereoscopic image.

SUMMARY OF THE INVENTION

The abstract of Japanese Patent Application Laid-Open No. 11-164325 describes that slit images cut out from continuously shot images into slit shapes are coupled together to create panorama images for left eye viewing and right eye viewing. However, the specification of Japanese Patent Application Laid-Open No. 11-164325 does not have a description at all regarding creation of panorama images for left eye viewing and right eye viewing.

Moreover, while adjustment of a parallax in a stereoscopic panorama image (3D panorama image) has not been mentioned conventionally, the parallax amount adjusting technologies described in Patent Literatures 2 to 4 can be applied to a 3D panorama image.

Meanwhile, a 3D panorama image is large compared with an aspect ratio of a screen of a normal 3D display (4:3, 16:9). To cause a whole 3D panorama image to be displayed on a 3D display, upper and lower portions of the screen of the 3D display are masked for display. On the other hand, to effectively use the whole screen of the 3D display, the 3D panorama image is magnified so that the width of the 3D panorama image in a longitudinal direction coincides with the width of the 3D display in a longitudinal direction. Then, this magnified 3D panorama image is reproduced by scrolling, or the 3D panorama image is divided into a plurality of frames so as to have the aspect ratio of the 3D display and then these frames obtained by division are reproduced by frame advance.

Conventionally, there is no 3D panorama image reproducing apparatus that automatically adjusts a parallax when a 3D panorama image is reproduced by scrolling or frame advance so that the image has an optimum parallax for each scroll position or each frame. In particular, when a 3D panorama image is reproduced by scrolling or frame advance, the case occurs such that a cross point portion (a portion without a parallax between left and right images), which significantly affects how the 3D image is viewed, is not present in a 3D image displayed on a 3D display, thereby disadvantageously making stereoscopic viewing difficult.

The presently disclosed subject matter was made in view of these circumstances, and has an object of providing a stereoscopic panorama image creating apparatus, method and program, stereoscopic panorama image reproducing apparatus, method and program, and recording medium, capable of automatically adjusting a parallax for each scroll position or each frame when a stereoscopic panorama image is reproduced by scrolling or frame advance.

To achieve the object described above, a stereoscopic panorama image creating apparatus according to a first aspect of the presently disclosed subject matter includes stereoscopic image obtaining means obtaining a plurality of stereoscopic images formed of left images and right images shot by a stereoscopic imaging apparatus, the stereoscopic images continuously shot with the stereoscopic imaging apparatus being swung in a constant direction; stereoscopic panorama image creating means creating a stereoscopic panorama image formed of left and right panorama images by synthesizing the left images together and synthesizing the right images together from among the plurality of stereoscopic images obtained by the stereoscopic image obtaining means; corresponding point detecting means detecting a plurality of corresponding points for parallax adjustment, the corresponding points having features matched between the left images and the right images of the plurality of stereoscopic images obtained by the stereoscopic image obtaining means or between the left and right panorama images of the created stereoscopic panorama image; image shift amount calculating means calculating a plurality of image shift amounts for setting parallaxes of the detected plurality of corresponding points each at a predetermined parallax amount; and recording means recording the created stereoscopic panorama image in a recording medium and recording position information of the plurality of corresponding points for parallax adjustment on the stereoscopic panorama image and the calculated plurality of image shift amounts as being associated with each other in the recording medium as auxiliary information of the stereoscopic panorama image.

According to the invention in accordance with the first aspect described above, a plurality of corresponding points for parallax adjustment are detected for a stereoscopic panorama image. And, together with position information of each corresponding point on the stereoscopic panorama image, an image shift amount for setting a parallax of each corresponding point at a predetermined parallax amount is recorded on a recording medium as auxiliary information of the stereoscopic panorama image. Thus, when the stereoscopic panorama image is reproduced by scrolling or frame advance, the auxiliary information can be used to automatically adjust the parallax for each scroll position or each frame.

In the stereoscopic panorama image creating apparatus according to a second aspect of the presently disclosed subject matter, in the first aspect described above, the corresponding point detecting means is configured to detect a set of corresponding points for each set of the left image and the right image of each of the stereoscopic images obtained by the stereoscopic image obtaining means, and the image shift amount calculating means is configured to calculate the image shift amounts each for setting a parallax between the detected corresponding points at the predetermined parallax amount. According to this, the image shift amount is calculated and recorded as many as the number of stereoscopic images used in synthesis for the stereoscope panorama image. Also, the image shift amount can be calculated before the stereoscopic panorama image is created.

In the stereoscopic panorama image creating apparatus according to a third aspect of the presently disclosed subject matter, in the second aspect described above, the corresponding point detecting means is configured to detect the set of corresponding points for each set of the left image and the right image of each of the stereoscopic images in a portion near a center of the stereoscopic image.

In the stereoscopic panorama image creating apparatus according to a fourth aspect of the presently disclosed subject matter, in the third aspect described above, when necessary corresponding points are not detected by the corresponding point detecting means in the portion near the center of the stereoscopic image, the image shift amount calculating means is configured to set image shift amounts set in advance as calculation values or calculates the image shift amounts by interpolation between adjacent image shift amounts. With this, even if a corresponding point having a feature is not detected in the portion near the center of the stereoscopic image, the image shift amount can be found.

In the stereoscopic panorama image creating apparatus according to a fifth aspect of the presently disclosed subject matter, in any one of the first to fourth aspects described above, the stereoscopic panorama image creating means is configured to create the stereoscopic panorama image by piecing slit images each in a strip shape together, the slit images being in a portion near a center from among the plurality of stereoscopic images obtained by the stereoscopic image obtaining means.

The stereoscopic panorama image creating apparatus according to a sixth aspect of the presently disclosed subject matter, in the first aspect described above, further includes object detecting means detecting a necessary object included in the plurality of stereoscopic images obtained by the stereoscopic image obtaining means or the created stereoscopic panorama image, wherein the corresponding point detecting means is configured to detect a corresponding point for each object detected by the object detecting means. The object detecting means detects, for example, in addition to a human face, an artificial construction such as a building or a wall and others serving as a main subject. With this, when the stereoscopic panorama image is reproduced by scrolling or frame advance, parallax adjustment can be automatically performed for each object detected in the stereoscopic panorama image.

The stereoscopic panorama image creating apparatus according to a seventh aspect of the presently disclosed subject matter, in any one of the first to sixth aspects described above, further includes interpolation computing means calculating continuous pixel shift amounts by interpolating pixel shift amounts between the corresponding points based on the plurality of image shift amounts calculated by the image shift amount calculating means, wherein the recording means is configured to record the plurality of image shift amounts calculated by the image shift amount calculating means and the pixel shift amounts calculated by the interpolation computing means in the recording medium. According to this, when the stereoscopic panorama image is reproduced by scrolling, the image shift amount subjected to an interpolation computation can be used to continuously perform parallax adjustment.

In the stereoscopic panorama image creating apparatus according to an eighth aspect of the presently disclosed subject matter, in any one of the first to sixth aspects described above, the predetermined parallax amount is zero.

A stereoscopic panorama image reproducing apparatus according to a ninth aspect of the presently disclosed subject matter includes reading means reading a stereoscopic panorama image and auxiliary information of the stereoscopic panorama image from the recording medium according to any one of the first to eighth aspects described above; reproducing means causing the read stereoscopic panorama image to be magnified with a predetermined magnification and causing the magnified stereoscopic panorama image to be reproduced by scrolling on a stereoscopic display or reproduced by frame advance for each of a plurality of frames obtained by dividing the stereoscopic panorama image, automatically or with a manual instruction input; and parallax adjusting means selecting one image shift amount from among a plurality of image shift amounts recorded as the auxiliary information of the stereoscopic panorama image, the image shift amount corresponding to a stereoscopic image in a screen of the stereoscopic display, and performing parallax adjustment of the stereoscopic image based on the selected image shift amount, when the stereoscopic panorama image is reproduced by scrolling or frame advance by the reproducing means.

According to the ninth aspect described above, the stereoscopic panorama image and the auxiliary information of the stereoscopic panorama image (such as the plurality of image shift amounts) recorded on the recorded medium according to any one of the first to eighth aspects described above are read. Then, when the read stereoscopic panorama image is magnified with a predetermined magnification, and the magnified stereoscopic panorama image is reproduced by scrolling on a stereoscopic display automatically or with a manual instruction input or reproduced by frame advance for each of a plurality of frames obtained by dividing the stereoscopic panorama image, the auxiliary information can be used to automatically perform parallax adjustment for each scroll position or each frame. With this, a cross point portion (a portion without a parallax between left and right images), which significantly affects how the stereoscopic image is viewed, can be adjusted to make stereoscopic viewing easy.

Note that while the predetermined magnification is preferably a magnification with which the width of the stereoscopic panorama image in a longitudinal direction coincides with the width of the stereoscopic display in a longitudinal direction, but may be larger or smaller than this magnification. Furthermore, the predetermined magnification may be adjustable as appropriate.

A stereoscopic panorama image reproducing apparatus according to a tenth aspect of the presently disclosed subject matter includes stereoscopic panorama image obtaining means obtaining a stereoscopic panorama image formed of left and right panorama images; corresponding point detecting means detecting, prior to reproduction of the obtained stereoscopic panorama image, a plurality of corresponding points for parallax adjustment in the stereoscopic panorama image, the corresponding points having features matched between the left and right panorama images; image shift amount calculating means calculating image shift amounts for setting parallaxes of the detected plurality of corresponding points each at a predetermined parallax amount; storage means storing position information of the plurality of corresponding points for parallax adjustment on the stereoscopic panorama image and the calculated plurality of image shift amounts as being associated with each other; reproducing means causing the obtained stereoscopic panorama image to be magnified with a predetermined magnification and causing the magnified stereoscopic panorama image to be reproduced by scrolling on a stereoscopic display or reproduced by frame advance for each of a plurality of frames obtained by dividing the stereoscopic panorama image, automatically or with a manual instruction input; and parallax adjusting means selecting one image shift amount from among a plurality of image shift amounts stored in the storage means correspondingly to the stereoscopic panorama image, the image shift amount corresponding to a stereoscopic image in a screen of the stereoscopic display, and performing a parallax adjustment of the stereoscopic image based on the selected image shift amount, when the stereoscopic panorama image is reproduced by scrolling or frame advance by the reproducing means.

The tenth aspect described above is directed to a stereoscopic panorama image reproducing apparatus when auxiliary information of the stereoscopic panorama image (auxiliary information such as the plurality of image shift amounts) cannot be obtained from the recording medium. Prior to reproduction of the stereoscopic panorama image, the stereoscopic panorama image reproducing apparatus detects a plurality of corresponding points for parallax adjustment, the corresponding points having features matched between the left and right panorama images, calculates image shift amounts for setting parallaxes of these corresponding points each at a predetermined parallax amount, stores position information of the plurality of corresponding points for parallax adjustment on the stereoscopic panorama image and the calculated plurality of image shift amounts as being associated with each other, and then uses the stored plurality of image shift amounts to perform parallax adjustment at the time of reproducing of the stereoscopic panorama image by scrolling or by frame advance. Note that parallax adjustment at the time of reproducing of the stereoscopic panorama image by scrolling or by frame advance is performed in a manner similar to that of the ninth aspect described above.

In the stereoscopic panorama image reproducing apparatus according to an eleventh aspect of the presently disclosed subject matter, in the tenth aspect described above, the corresponding point detecting means is configured to detect one set of corresponding points for each of slit images each in a strip shape obtained by dividing the panorama image.

In the stereoscopic panorama image reproducing apparatus according to a twelfth aspect of the presently disclosed subject matter, in the eleventh aspect described above, when necessary corresponding points are not detected by the corresponding point detecting means in a portion near a center of the stereoscopic image, the image shift amount calculating means is configured to set image shift amounts set in advance as calculation values or calculates the image shift amounts by interpolation between adjacent image shift amounts.

The stereoscopic panorama image reproducing apparatus according to a thirteenth aspect of the presently disclosed subject matter, in the tenth aspect described above, further includes object detecting means detecting a necessary object included in the obtained stereoscopic panorama image, wherein the corresponding point detecting means is configured to detect a corresponding point for each object detected by the object detecting means. With this, when the stereoscopic panorama image is reproduced by scrolling or divided frame advance, parallax adjustment can be performed for each object in the stereoscopic panorama image.

The stereoscopic panorama image reproducing apparatus according to a fourteenth aspect of the presently disclosed subject matter, in any one of the tenth to thirteenth aspects described above, further includes interpolation computing means calculating continuous pixel shift amounts by interpolating pixel shift amounts between the corresponding points based on the plurality of image shift amounts calculated by the image shift amount calculating means, wherein the storage means is configured to store the plurality of image shift amounts calculated by the image shift amount calculating means and the pixel shift amounts calculated by the interpolation computing means.

In the stereoscopic panorama image reproducing apparatus according to a fifteenth aspect of the presently disclosed subject matter, in any one of the tenth to fourteenth aspects described above, the predetermined parallax amount is zero.

In the stereoscopic panorama image reproducing apparatus according to a sixteenth aspect of the presently disclosed subject matter, in any one of the ninth to fifteenth aspects described above, the parallax adjusting means is configured to select the image shift amount at a center of the screen of the stereoscopic display or in a portion closest to the center of the screen, and perform a parallax adjustment of the stereoscopic image based on the selected image shift amount. According to this, at the parallax amount of the subject at the center of the screen of the stereoscopic display or in a portion close to the center can be set at a predetermined parallax amount to make stereoscopic viewing of the subject easy. Note that, as described in the fifteenth aspect described above, when the predetermined parallax amount is zero, the target subject is displayed flatly and can be most easily viewable. However, the presently disclosed subject matter is not restricted to this. For example, the predetermined parallax amount may be set at an appropriate value and the parallax amount may be adjusted so that the target subject appears to be popped up a little forward.

The stereoscopic panorama image reproducing apparatus according to a seventeenth aspect of the presently disclosed subject matter is configured to, in any one of the ninth to sixteenth aspects described above, when the reproducing means reproduces the stereoscopic panorama image by scrolling with a manual instruction input, select one image shift amount corresponding to a stereoscopic image displayed in a screen of the stereoscopic display at a time of starting the scrolling with the manual instruction input by a time of stopping scrolling and, when the scrolling is stopped, select one image shift amount corresponding to a stereoscopic image displayed in the screen of the stereoscopic displayed at the time of stopping scrolling, and perform a parallax adjustment of the stereoscopic images based on the selected image shift amounts. As such, parallax adjustment during scrolling is fixed, thereby allowing reduction in eye fatigue due to parallax fluctuations and allowing parallax adjustment corresponding to the stopped stereoscopic image at the time of stopping the scrolling.

In the stereoscopic panorama image reproducing apparatus according to an eighteenth aspect of the presently disclosed subject matter, in any one of the ninth to sixteenth aspects described above, the reproducing means is configured to cause only one of the left image and the right image to be displayed on the stereoscopic display during scrolling by reproduction by scrolling with a manual instruction input, and cause the stereoscopic image to be displayed on the stereoscopic display when the scrolling is stopped, and at a time of stopping scrolling, the parallax adjusting means is configured to select one image shift amount corresponding to the stereoscopic image displayed in a screen of the stereoscopic display at the time of stopping scrolling, and perform a parallax adjustment of the stereoscopic image based on the selected image shift amount. As such, since a flat image is displayed during scrolling, eye fatigue can be reduced, and the parallax adjustment corresponding to the stopped stereoscopic image can be performed at the time of stopping the scrolling.

In the stereoscopic panorama image reproducing apparatus according to a nineteenth aspect of the presently disclosed subject matter, in any one of the ninth to eighteenth aspects described above, the reproducing means is configured to cause a whole of the stereoscopic panorama image to be displayed on the stereoscopic displayed, and then cause the stereoscopic panorama image to be magnified with a predetermined magnification and replayed by scrolling or frame advance. With this, after the whole stereoscopic panorama image is checked, the enlarged and zoomed stereoscopic panorama image can be viewed as being scrolled or being subjected to divided frame advance.

A stereoscopic panorama image creating method according to a twentieth aspect of the presently disclosed subject matter includes a stereoscopic image obtaining step of obtaining a plurality of stereoscopic images formed of left images and right images shot by a stereoscopic imaging apparatus, the stereoscopic images continuously shot with the stereoscopic imaging apparatus being swung in a constant direction; a stereoscopic panorama image creating step of creating a stereoscopic panorama image formed of left and right panorama images by synthesizing the left images together and synthesizing the right images together from among the obtained plurality of stereoscopic images; a corresponding point detecting step of detecting a plurality of corresponding points for parallax adjustment, the corresponding points having features matched between the left images and the right images of the obtained plurality of stereoscopic images or between the left and right panorama images of the created stereoscopic panorama image; an image shift amount calculating step of calculating image shift amounts for setting parallaxes of the detected plurality of corresponding points each at a predetermined parallax amount; and a recording step of recording the created stereoscopic panorama image in a recording medium and recording position information of the plurality of corresponding points for parallax adjustment on the stereoscopic panorama image and the calculated plurality of image shift amounts as being associated with each other in the recording medium as auxiliary information of the stereoscopic panorama image.

In the stereoscopic panorama image creating method according to a twenty-first aspect of the presently disclosed subject matter, in the twentieth aspect described above, the corresponding point detecting step is configured to detect a set of corresponding points for each set of the left image and the right image of each of the obtained stereoscopic images, and the image shift amount calculating step is configured to specify one set of corresponding points from among the corresponding points detected for each of the stereoscopic images and calculate the image shift amounts each for setting a parallax between the corresponding points at the predetermined parallax amount.

In the stereoscopic panorama image creating method according to a twenty-second aspect of the presently disclosed subject matter, in the twenty-first aspect described above, the corresponding point detecting step is configured to detects the set of corresponding points for each set of the left image and the right image of each of the stereoscopic images in a portion near a center of the stereoscopic image.

In the stereoscopic panorama image creating method according to a twenty-third aspect of the presently disclosed subject matter, in the twenty-second aspect described above, when necessary corresponding points are not detected in the corresponding point detecting step in the portion near the center of the stereoscopic image, the image shift amount calculating step is configured to set image shift amounts set in advance as calculation values or calculate the image shift amounts by interpolation between adjacent image shift amounts.

In the stereoscopic panorama image creating method according to a twenty-fourth aspect of the presently disclosed subject matter, in any one of the twentieth to twenty-third aspects described above, the stereoscopic panorama image creating step is configured to create the stereoscopic panorama image by piecing slit images each in a strip shape together, the slit images being in a portion near a center from among the obtained plurality of stereoscopic images.

The stereoscopic panorama image creating method according to a twenty-fifth aspect of the presently disclosed subject matter, in the twentieth aspect described above, further includes an object detecting step of detecting a necessary object included in the obtained plurality of stereoscopic images or the created stereoscopic panorama image, wherein the corresponding point detecting step is configured to detect a corresponding point for each object detected by the object detecting step.

The stereoscopic panorama image creating method according to a twenty-sixth aspect of the presently disclosed subject matter, in any one of the twentieth to twenty-fifth aspects described above, further includes an interpolation computing step of calculating continuous pixel shift amounts by interpolating pixel shift amounts between the corresponding points based on the plurality of image shift amounts calculated in the image shift amount calculating step, wherein the recording step is configured to record the plurality of image shift amounts calculated in the image shift amount calculating step and the pixel shift amounts calculated in the interpolation computing step in the recording medium.

In the stereoscopic panorama image creating method according to a twenty-seventh aspect of the presently disclosed subject matter, in any one of the twentieth to twenty-fifth aspects described above, the predetermined parallax amount is zero.

A stereoscopic panorama image reproducing method according to a twenty-eighth aspect of the presently disclosed subject matter includes a reading step of reading a stereoscopic panorama image and auxiliary information of the stereoscopic panorama image from the recording medium according to any one of the twentieth to twenty-seventh aspects described above; a reproducing step of causing the read stereoscopic panorama image to be magnified with a predetermined magnification and causing the magnified stereoscopic panorama image to be reproduced by scrolling on a stereoscopic display or reproduced by frame advance for each of a plurality of frames obtained by dividing the stereoscopic panorama image, automatically or with a manual instruction input; and a parallax adjusting step of selecting one image shift amount from among a plurality of image shift amounts recorded as the auxiliary information of the stereoscopic panorama image, the image shift amount corresponding to a stereoscopic image in a screen of the stereoscopic display, and performing a parallax adjustment of the stereoscopic image based on the selected image shift amount, when the stereoscopic panorama image is reproduced by scrolling or frame advance in the reproducing step.

A stereoscopic panorama image reproducing method according to a twenty-ninth aspect of the presently disclosed subject matter includes a stereoscopic panorama image obtaining step of obtaining a stereoscopic panorama image formed of left and right panorama images; a corresponding point detecting step of detecting, prior to reproduction of the obtained stereoscopic panorama image, a plurality of corresponding points for parallax adjustment in the stereoscopic panorama image, the corresponding points having features matched between the left and right panorama images; an image shift amount calculating step of calculating image shift amounts for setting parallaxes of the detected plurality of corresponding points each at a predetermined parallax amount; a storing step of storing position information of the plurality of corresponding points for parallax adjustment on the stereoscopic panorama image and the calculated plurality of image shift amounts as being associated with each other; a reproducing step of causing the obtained stereoscopic panorama image to be magnified with a predetermined magnification and causing the magnified stereoscopic panorama image to be reproduced by scrolling on a stereoscopic display or reproduced by frame advance for each of a plurality of frames obtained by dividing the stereoscopic panorama image, automatically or with a manual instruction input; and a parallax adjusting step of selecting one image shift amount from among a plurality of image shift amounts stored in the storage means correspondingly to the stereoscopic panorama image, the image shift amount corresponding to a stereoscopic image in a screen of the stereoscopic display, and performing parallax adjustment of the stereoscopic image based on the selected image shift amount, when the stereoscopic panorama image is reproduced by scrolling or frame advance in the reproducing step.

In the stereoscopic panorama image reproducing method according to a thirtieth aspect of the presently disclosed subject matter, in the twenty-ninth aspect described above, the corresponding point detecting step is configured to detect one set of corresponding points for each of slit images each in a strip shape obtained by dividing the panorama image.

In the stereoscopic panorama image reproducing method according to a thirty-first aspect of the presently disclosed subject matter, in the thirtieth aspect described above, when necessary corresponding points are not detected in the corresponding point detecting step in a portion near a center of the stereoscopic image, the image shift amount calculating step is configured to set image shift amounts set in advance as calculation values or calculate the image shift amounts by interpolation between adjacent image shift amounts.

The stereoscopic panorama image reproducing method according to a thirty-second aspect of the presently disclosed subject matter, in the twenty-ninth aspect described above, further includes an object detecting step of detecting a necessary object included in the obtained stereoscopic image, wherein the corresponding point detecting step is configured to detect a corresponding point for each object detected in the object detecting step.

The stereoscopic panorama image reproducing method according to a thirty-third aspect of the presently disclosed subject matter, in any one of the twenty-ninth to thirty-second aspects described above, further includes an interpolation computing step of calculating continuous pixel shift amounts by interpolating pixel shift amounts between the corresponding points based on the plurality of image shift amounts calculated in the image shift amount calculating step, wherein the storing step is configured to store the plurality of image shift amounts calculated in the image shift amount calculating step and the pixel shift amounts calculated in the interpolation computing step.

In the stereoscopic panorama image reproducing method according to a thirty-fourth aspect of the presently disclosed subject matter, in any one of the twenty-ninth to thirty-third aspects described above, the predetermined parallax amount is zero.

In the stereoscopic panorama image reproducing method according to a thirty-fifth aspect of the presently disclosed subject matter, in any one of the twenty-eighth to thirty-fourth aspects described above, the parallax adjusting step is configured to select the image shift amount at a center of a screen of the stereoscopic display or in a portion closest to the center of the screen, and perform parallax adjustment of the stereoscopic image based on the selected image shift amount.

In the stereoscopic panorama image reproducing method according to a thirty-sixth aspect of the presently disclosed subject matter, in any one of the twenty-eighth to thirty-fifth aspects described above, when the reproducing step reproduces the stereoscopic panorama image by scrolling with a manual instruction input, the parallax adjusting step is configured to select one image shift amount corresponding to a stereoscopic image displayed in a screen of the stereoscopic display at a time of starting the scrolling with the manual instruction input by a time of stopping scrolling and, when the scrolling is stopped, select one image shift amount corresponding to a stereoscopic image displayed in the screen of the stereoscopic displayed at the time of stopping scrolling, and perform a parallax adjustment of the stereoscopic images based on the selected image shift amounts.

In the stereoscopic panorama image reproducing method according to a thirty-seventh aspect of the presently disclosed subject matter, in any one of the twenty-eighth to thirty-fifth aspects described above, the reproducing step is configured to cause only one of the left image and the right image to be displayed on the stereoscopic display during scrolling by reproduction by scrolling with a manual instruction input, and cause the stereoscopic image to be displayed on the stereoscopic display when the scrolling is stopped, and at a time of stopping scrolling, the parallax adjusting step is configured to select one image shift amount corresponding to the stereoscopic image displayed in a screen of the stereoscopic display at the time of stopping scrolling, and perform a parallax adjustment of the stereoscopic image based on the selected image shift amount.

In the stereoscopic panorama image reproducing method according to a thirty-eighth aspect of the presently disclosed subject matter, in any one of the twenty-eighth to thirty-seventh aspects described above, the reproducing step causes a whole of the stereoscopic panorama image to be displayed on the stereoscopic displayed, and then causes the stereoscopic panorama image to be magnified with a predetermined magnification and replayed by scrolling or frame advance.

A stereoscopic panorama image reproducing program according to a thirty-ninth aspect of the presently disclosed subject matter is configured so that the stereoscopic panorama image creating apparatus according to any one of the first to eighth aspects described above is achieved by a computer.

A stereoscopic panorama image creating program according to a fortieth aspect of the presently disclosed subject matter is configured so that the stereoscopic panorama image reproducing apparatus according to any one of the ninth to nineteenth aspects described above is achieved by a computer.

In the presently disclosed subject matter, a plurality of corresponding points for parallax adjustment for a stereoscopic panorama image are detected and, together with position information of each corresponding point on the stereoscopic panorama image, an image shift amount for setting a parallax of each corresponding point at a predetermined parallax amount is calculated and recorded. Thus, when the stereoscopic panorama image is reproduced by scrolling or frame advance, the recorded image shift amount can be used to automatically adjust the parallax for each scroll position or each frame. With this, the stereoscopic panorama image stereoscopically viewable with ease can be reproduced by scrolling or frame advance.

BRIEF DESCRIPTION OF THE DRAWINGS

FIG. 5 is a table illustrating an example of auxiliary information having recorded thereon a CP amount ($\Delta x$) in association with coordinates (x, y) of a cross point CP of each 3D image.

FIG. 7 is a flowchart illustrating a first embodiment of a method of reproducing a 3D panorama image.

DETAILED DESCRIPTION OF THE EMBODIMENTS

The stereoscopic panorama image creating apparatus, method, and program, stereoscopic panorama image reproducing apparatus, method, and program, and recording medium according to the presently disclosed subject matter are described below in accordance with the attached drawings.

Outer Appearance of Stereoscopic Imaging Apparatus

Figure 1A:
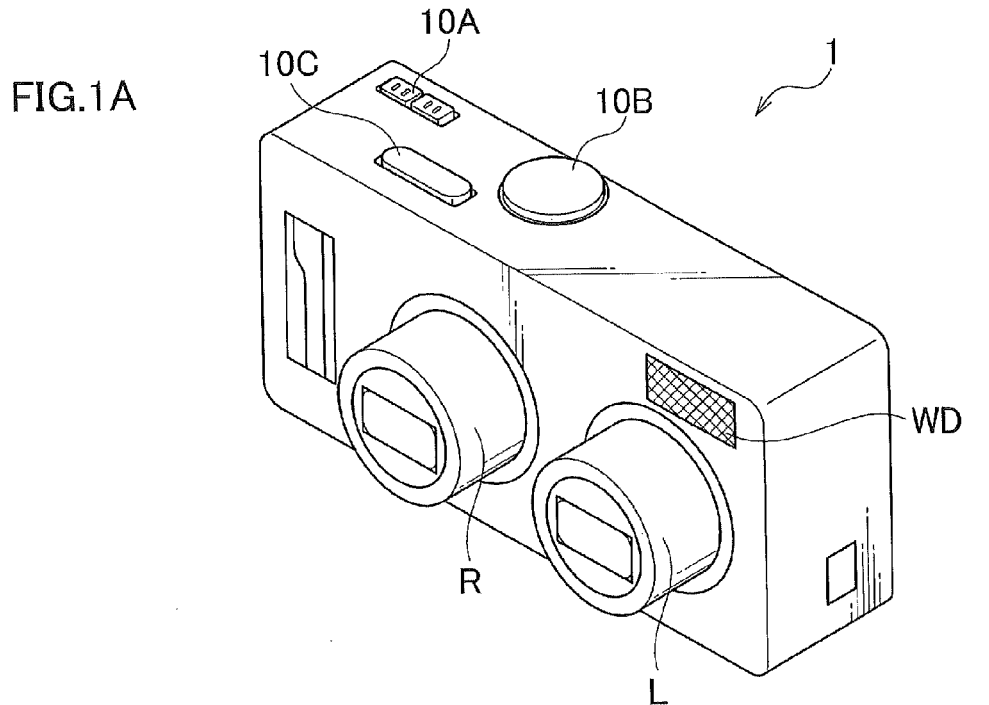
FIG. 1A is a front perspective view of a stereoscopic imaging apparatus according to an embodiment of the presently disclosed subject matter.
Figure 1B:
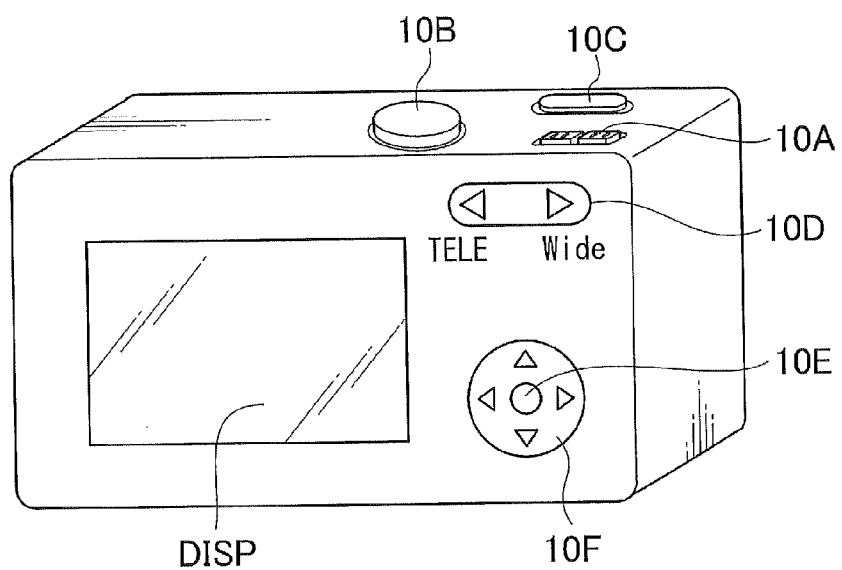
FIG. 1B is a rear perspective view of the stereoscopic imaging apparatus according to the embodiment of the presently disclosed subject matter.

FIG. 1A and FIG. 1B are external views of a stereoscopic imaging apparatus according to an embodiment of the presently disclosed subject matter. FIG. 1A is a perspective view of a stereoscopic imaging apparatus 1 when viewed diagonally from above, and FIG. 1B is a perspective view of the stereoscopic imaging apparatus 1 when viewed from a rear surface.

As illustrated in FIG. 1A, a stereoscopic imaging apparatus 1 is provided with left imaging units L and R. These imaging units are hereinafter referred to as a first imaging unit L and a second imaging unit R for identification.

The first imaging unit L and the second imaging unit R are arranged side by side so as to be able to obtain an image signal for stereoscopic viewing. At these imaging units L and R, a left image signal and a right image signal are created, respectively. When a power supply switch 10A on an upper surface of the stereoscopic imaging apparatus 1 of FIG. 1A and FIG. 1B is operated, a shooting mode dial 10B is set in a mode, for example, a stereoscopic mode, and then a shutter button 10C is operated, image data for stereoscopic viewing are created at both of the imaging units L and R.

The shutter button 10C included in the stereoscopic imaging apparatus 1 of this embodiment has two operation modes, a half-press and a full-press. In this stereoscopic imaging apparatus 1, exposure adjustment and focus adjustment are performed when the shutter button 10C is half-pressed, and shooting is performed when full-pressed. Also, when the luminance of field is too dark, a flash firing window WD firing a flash of light toward a subject is provided above the imaging unit L.

Still further, as illustrated in FIG. 1B, the stereoscopic imaging apparatus 1 is provided at the back with a liquid-crystal monitor DISP capable of three-dimensional display. On this liquid-crystal monitor DISP, the same subject being captured by both of the imaging units L and R is displayed as a stereoscopic image. Note that examples of the liquid-crystal monitor DISP that can be applied include those using a lenticular lens or a parallax barrier and those that allow a right image and a left image to be separately viewed by wearing dedicated glasses such as polarized glasses or liquid-crystal shutter glasses. Still further, operators such as a zoom switch 10D, a menu/OK button 10E, and a cross key 10F are provided and arranged. In the following, operation switches including the power supply switch 10A, the shooting mode dial 10B, the shutter button 10C, the zoom switch 10D, the menu/OK button 10E, and the cross key 10F may be collectively referred to as an operating unit 10.

Inner Structure of Stereoscopic Imaging Apparatus

Figure 2:
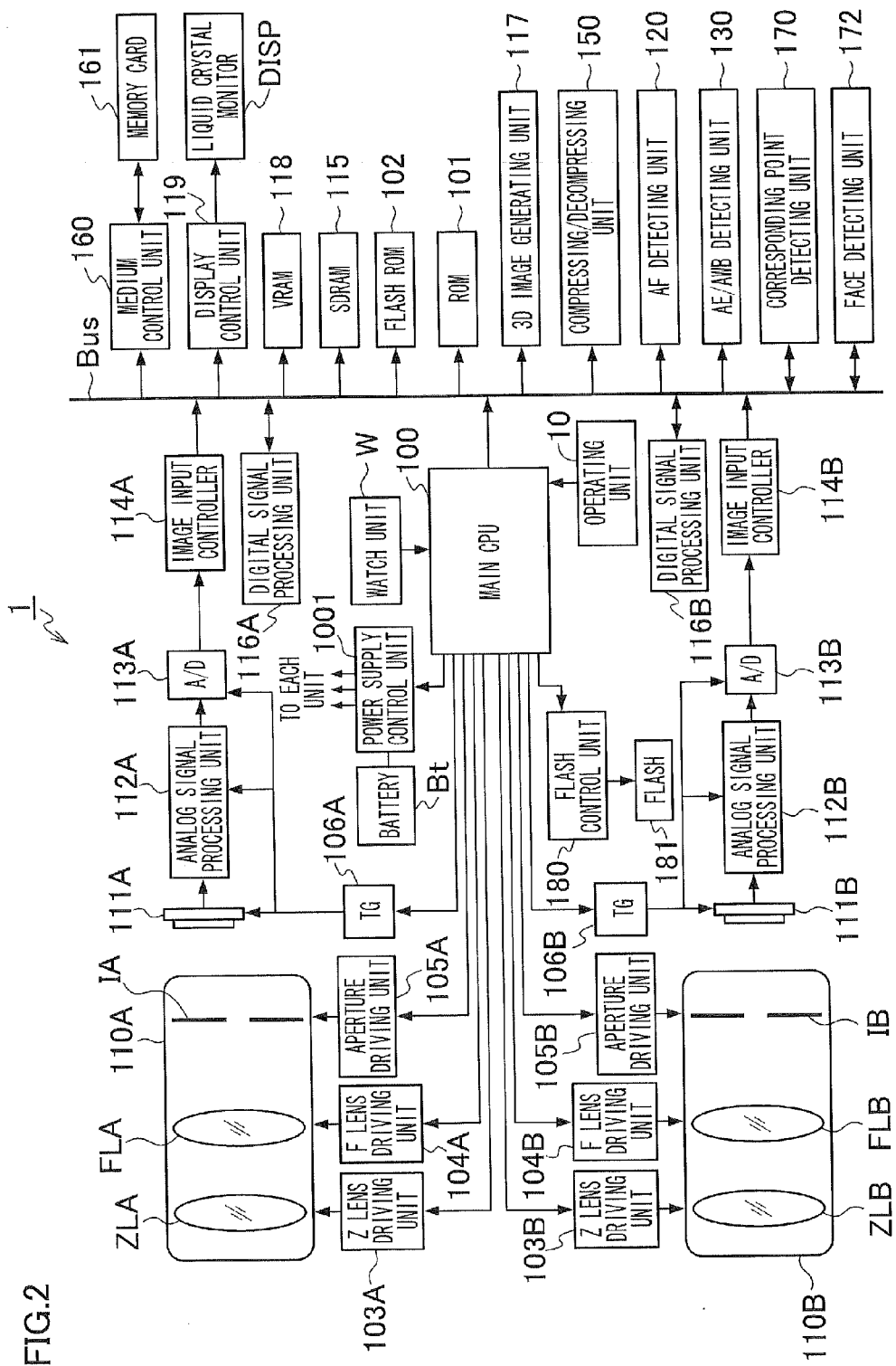
FIG. 2 is a block diagram illustrating an inner structure of the stereoscopic imaging apparatus of FIG. 1.

FIG. 2 is a block diagram illustrating an inner structure of the stereoscopic imaging apparatus 1 of FIG. 1A and FIG. 1B. With reference to FIG. 2, the inner structure of the stereoscopic imaging apparatus 1 is described.

The operation of this stereoscopic imaging apparatus 1 is controlled in a centralized manner by a main CPU (Central Processing Unit) 100.

To the main CPU 100, a ROM (read-only memory) 101 is connected via a bus Bus. In the ROM 101, programs required for this stereoscopic imaging apparatus 1 to operate are stored. By following procedures of these programs, the main CPU 100 controls the operation of this stereoscopic imaging apparatus 1 in a centralized manner according to an instruction from the operating unit 10.

The mode dial 10B of the operating unit 10 is selecting means for selecting any of an auto shooting mode, a manual shooting mode, a scene position of people, landscape, nightscape, or others, a moving picture mode for shooting a moving picture, and a stereoscopic (3D) panorama image shooting mode and a 3D panorama image reproduction mode according to the presently disclosed subject matter. Also, a reproduction button not illustrated of the operating unit 10 is a button for switching to a reproduction mode in which a still picture or a moving picture shot and recorded is displayed on the liquid-crystal monitor DISP. The menu/OK button 10E is an operation key including both of a function as a menu button for making an instruction of displaying a menu on a screen of the liquid-crystal monitor DISP and a function as an OK button for making an instruction for determination and execution of a selected item and others. The cross key 10F is an operating unit for inputting an instruction in any of four directions including upward, downward, leftward, and rightward, and functions as a button (cursor movement operating means) for selecting an item from a menu screen or making an instruction of selecting any of various setting items from each menu. Also, upward/downward keys on the cross key 10F function as a zoom switch at the time of shooting a reproduction zoom switch at the time of a reproduction mode, and leftward/rightward keys function as a frame advance (forward direction/reverse direction feeding) button at the time of a reproduction mode.

First, when the power supply switch 10A in the operating unit 10 illustrated in FIG. 1 is operated, the main CPU 100 controls a power supply control unit 1001 to cause power from a battery Bt to be supplied to each unit of FIG. 2 via the power supply control unit 1001, thereby causing this stereoscopic imaging apparatus 1 to make a transition to be in an operating state. In this manner, the main CPU 100 starts a shooting process. Note that an AF (automatic focus) detecting unit 120, an AE/AWB (automatic exposure/automatic white balance) detecting unit 130, an image input controller 114A, a digital signal processing unit 116A, and a 3D image creating unit 117 are each assumed to be configured from a processor such as a DSP (Digital Signal Processor) and the main CPU 100 is assumed to perform processes in cooperation with these DSPs.

Here, the inner structure of the first imaging unit L and the second imaging unit R described above with reference to FIG. 1 is described with reference to FIG. 2. Note that description is made by providing a word "first" to each component member of the first imaging unit L and a word "second" to each component member of the second imaging unit L.

The first imaging unit L is provided with a first shooting optical system 110A including a first focus lens FLA, a first focus lens driving unit (hereinafter referred to as a first F lens driving unit) 104A for moving that first focus lens FLA in an optical axis direction, and a first imaging element 111A for receiving subject light obtained by forming an image of a subject in the first shooting optical system 110A and creating an image signal representing that subject. This first shooting optical system 110A is provided further with a first aperture IA and a first aperture driving unit 105A for changing an opening diameter of this first aperture IA.

Also, the first shooting optical system 100A includes a zoom lens ZLA. A Z lens driving unit 103A for controlling that zoom lens ZLA so that the zoom lens is set to have a predetermined focal length is provided. Note that in FIG. 2, the fact that the whole shooting optical system is a zoom lens is schematically illustrated with one lens ZL.

On the other hand, as with the first imaging unit L, the second imaging unit R is provided with a shooting optical system including a second focus lens FLB, a second focus lens driving unit (hereinafter referred to as a second F lens driving unit) 104B for moving the second focus lens FLB in a direction of an optical axis, and a second imaging element 111B for receiving subject light obtained by forming an image of the subject in the second shooting optical system and creating an image signal representing that subject.

In these first imaging unit L and second imaging unit R, image signals for stereoscopic viewing are created. That is, a left image signal is created at the first imaging unit L and a right image signal is created at the second imaging unit R.

The first imaging unit L and the second imaging unit R have exactly the same structure only with a difference as to whether a left image signal or a right image signal is created, and signal processing after the image signals of both of the imaging units are converted to digital signals in a first A/D converting unit 113A and a second A/D converting unit 113B, respectively, and are then guided to the bus Bus is also the same. Therefore, the structure is described below along a flow of the image signal regarding the first imaging unit L.

First, an operation when the subject captured by the first imaging unit L is directly displayed on the liquid-crystal monitor DISP as a live view image (a through-the-lens image) is described.

Upon operation of the power supply switch 10A in the operating unit 10, the main CPU 100 controls the power supply control unit 1001 so that power from the battery Bt is supplied to each unit, thereby causing this stereoscopic imaging apparatus 1 to make a transition to be in an operating state.

The main CPU 100 first controls the F lens driving unit 104A and the aperture driving unit 105A to start exposure and focus adjustment. Furthermore, the main CPU 100 instructs a timing generator (TG) 106A to cause the imaging element 111A to set an exposure time by an electronic shutter, and cause an image signal to be outputted from the imaging element 111A to an analog signal processing unit 112A for each predetermined time (for example, 1/60 seconds).

At the analog signal processing unit 112A, upon receiving a supply of the timing signal from the TG 106A and receiving a supply of an image signal for each predetermined time from the imaging element 111A, a process of reducing noise or the like is performed. Then, the analog image signal subjected to the noise reducing process is supplied to the A/D converting unit 113A at the next stage. Also at this A/D converting unit 113A, in synchronization with the timing signal from the TG 106A, a process of converting the analog signal to a digital signal is performed at predetermined times. In this manner, the digital image signal obtained by conversion and outputted from the A/D converting unit 113A is guided by the image input controller 114A to the bus Bus at predetermined times. This image signal guided via the bus Bus is stored in an SDRAM (Synchronous Dynamic Random Access Memory) 115. Since an image signal is outputted for each predetermined time from the imaging element 111A, the contents of this SDRAM 115 is rewritten for each predetermined time.

The image signals stored in this SDRAM 115 are read for each predetermined time by DSPs configuring the AF detecting unit 120, the AE/AWB detecting unit 130, and the digital signal processing unit 116A.

At the AF detecting unit 120, for each predetermined time during which the main CPU 100 controls the F lend driving unit 104A to move the focus lens FLA, high-frequency components of the image signal in a focus area are extracted and accumulated to calculate an AF evaluation value indicating a contrast of the image. The main CPU 100 obtains the AF evaluation value calculated by the AF detecting unit 120, and the first focus lens FLA is moved via the F lens driving unit 104A to a lens position (a focusing position) where the AF evaluation value is a maximum. For this reason, even if the first imaging unit L is oriented to any direction, a focus is adjusted immediately, and a focused subject is approximately always displayed on the liquid-crystal monitor DISP.

Also, at the AE/AWB detecting unit 130, detection of a subject luminance and calculation of a gain to be set to a white balance amplifier in the digital signal processing unit 116A are performed for each predetermined time. In response to the result of detection of the luminance at this AE/AWB detecting unit 130, the main CPU 100 controls the aperture driving unit 105A to change the opening diameter of the aperture IA. Also, upon reception of the detection result from the AE/AWB detecting unit 130, the digital signal processing unit 116A sets the gain of the white balance amplifier.

At this digital signal processing unit 116A, a process is performed so that the image signal becomes suitable for display. Then, the image signal converted to the one more suitable for display with the signal processing of the digital signal processing unit 116A is supplied to the 3D image creating unit 117 and, at that 3D image creating unit 117, a right image signal for display is created. The created right image signal is stored in a VRAM (Video Random Access Memory) 118.

The same operation so far is performed also by the second imaging unit R with the same timing. Therefore, in the VRAM 118, two types of image signals are stored for right and left.

The main CPU 100 transfers the right image signal and the left image signal in the VRAM 118 to the display control unit 119 to cause an image to be displayed on a liquid-crystal monitor DISP. When images based on the right image signal and the left image signal are displayed on the liquid-crystal monitor DISP of FIG. 1B, the images on the liquid-crystal monitor DISP appear to be stereoscopic to human eyes. Since image signals are continuously outputted from the first and second imaging elements 111A and 111B for each predetermined time, the image signals in the VRAM 118 are rewritten for each predetermined time, and the stereoscopic image on the liquid-crystal monitor DISP is switched for each predetermined time, thereby causing a stereoscopic image to be displayed as a moving picture.

Here, when a subject on the liquid-crystal monitor DISP is referred to and the shutter button 10C in the operating unit 10 is half-pressed, an AE value detected immediately before the shutter button 10C is fully pushed is received by the AE/AWB detecting unit 130, and the first and second apertures IA and IB are each set to have an aperture diameter via the first and second aperture driving units 105A and 105B. Furthermore, in response to the half-pressing operation described above, the main CPU 100 causes the AF detecting unit 120 to calculate an AF evaluation value while the first focus lens FLA and the second focus lens FLB via the first F lens driving unit 104A and the second F lens driving unit 104B are being moved in a predetermined search range.

Based on the AF evaluation value calculated by the AF detecting unit 120, the main CPU 100 detects a lens position of the first focus lens FLA and a lens position of the second focus lens FLB where the AF evaluation value becomes maximum, and moves the first focus lens FLA and the second focus lens FLB to the first lens position and the second lens position, respectively.

Then, when the shutter button 10C is fully pushed, the main CPU 100 causes the first imaging element 111A and the second imaging element 111B to be exposed at a predetermined shutter speed via the first and second TG 106A and 106B to perform shoot a still picture. The main CPU 100 causes image signals to be outputted from the first and second imaging element s 111A and 111B to the first and second analog signal processing units 112A and 112B at off timing of an electronic shutter, thereby causing the first and second analog signal processing units 112A and 112B to perform a noise reducing process. The, at the first and second A/D converting units 113A and 113B, the analog image signal is converted to a digital image signal.

Here, by following an instruction of the main CPU 100, the first and second image input controllers 114A cause the digital image signals obtained by conversion at the first and second A/D converting units 113A and 113B to be once stored in the SDRAM 115 via the bus Bus. Then, the digital signal processing units 116A and 116B read the image signals in the SDRAM 115, perform image processing including white balance correction, gamma correction, synchronization processing in which a spatial shift in color signals of R (Red), G (Green), B (Blue), and others in association with a color filter arrangement on a single-plate CCD (Charge Coupled Device) is interpolated to match the position of each color signal with each other, outline correction, and creation of a luminance/color-difference signal (a YC signal), and then send the process results to the 3D image creating unit 117.

Subsequently, the main CPU 100 supplies the right image signal and the left image signal in the 3D image creating unit 117 to a compressing/decompressing unit 150 by using the bus Bus. The main CPU 100 causes this compressing/decompressing unit 150 to compress the image data, and then transfer the compressed data to a medium control unit by using the bus Bus and supplies header information regarding the compression and shooting to the medium control unit 160 to cause the medium control unit 160 to create an image file in a predetermined format (for example, as a 3D still picture, an image file in an MP (multipicture) format) and cause the image file to be recorded on a memory card 161.

When a 3D panorama image shooting mode is selected with the mode dial 10B of the operating unit 10, the main CPU 100 performs a process for shooting a plurality of stereoscopic images required for 3D panorama synthesis. Also, the 3D image creating unit 117 functions as an image processing unit that creates a 3D panorama image from a plurality of 3D images (a plurality of left images and a plurality of right images) shot at the time of the 3D panorama image shooting mode. Note that details of the operation of the stereoscopic imaging apparatus 1 at the time of the 3D panorama image shooting mode are described further below.

A corresponding point detecting unit 170 detects corresponding points where features match between 3D images (a left image and a right image), and also detects corresponding points where features match between preceding and subsequent images continuously shot at the time of the 3D panorama image shooting mode. The former corresponding point detection is used to calculate an image shift amount for use at the time of parallax adjustment of a 3D panorama image, and the latter corresponding point detection is used to calculate an optical flow (translation components) at the time of creating a 3D panorama image. Note that examples of a corresponding point detecting method include a method of extracting feature points by using the Harris scheme and tracking the feature points by using the KLT (Kanade Lucas Tomasi) method or the like.

A face detecting unit 172 detects a human face from a through-the-lens image, and outputs information about the position and dimensions of that face to the main CPU 100. That is, the face detecting unit 172 includes an image checking circuit and a face image template. The image matching circuit checks an image in a target region and the face image template against each other to see a correlation therebetween while moving the position of the target region on the screen of the through-the-lens image. Then, when a correlation score exceeds a preset threshold, the face detecting unit 172 recognizes the target region as a face region. Also, the face detecting unit 172 can detect a face from the shot image in a similar manner.

Note that any of other known methods can be used as the face detecting method, such as a face detecting method by edge detection or shape pattern detection and a face detecting method by color phase detection or skin color detection.

When obtaining information indicating the position and dimensions of the face region from the face detecting unit 172, the main CPU 100 can synthesize a face detection frame surrounding the obtained face region of the person with the through-the-lens image and cause the synthesis result to be displayed on the liquid-crystal monitor DISP. Also, the position and dimensions of the face region detected as described above are used as an AF area for focusing the human face or an AE area so as to make the brightness of the human face appropriate. Furthermore, the position of the face region detected in each 3D image can be used as a corresponding point to be detected by the corresponding point detecting unit 170.

Note that FIG. 2 illustrates a flash control unit 180, a flash 181 firing a flash of light from the flash firing window WD of FIG. 1A upon receiving an instruction from the flash control unit 180, and a watch unit W for detecting the current time.

Obtainment of 3D Images for Creating 3D Panorama Image and 3D Panorama Synthesis To shoot 3D images for 3D panorama synthesis, the 3D panorama image shooting mode is selected with the mode dial 10B of the operating unit 10.

Figure 3:
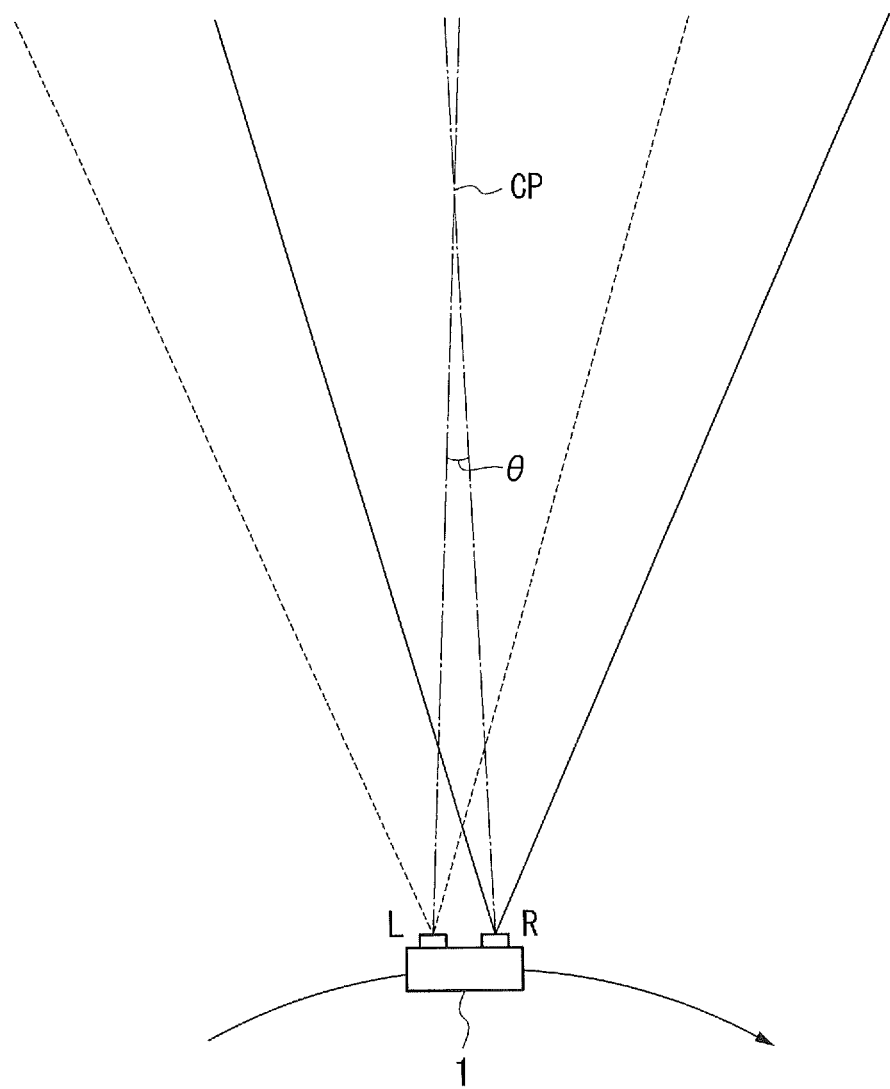
FIG. 3 is a drawing of a method of shooting a 3D image for 3D panorama synthesis.

Then, as illustrated in FIG. 3, the stereoscopic imaging apparatus 1 is swung in a constant direction and is caused to perform continuous shooting (consecutive shooting).

In FIG. 3, CP denotes a convergence point (hereinafter referred to as a cross point) where optical axes of the left and right imaging units L and R cross, and θ is an angle (an angle of convergence) formed by the optical axes of the left and right imaging units L and R. In this stereoscopic imaging apparatus 1, the cross point CP and the angle of convergence θ are fixed and, for example, a distance from the stereoscopic imaging apparatus 1 to the cross point CP is approximately 2 m. However, by shifting the left image and the right image relatively in a horizontal direction, the distance to the cross point CP can be virtually adjusted.

Meanwhile, the subject on the cross point CP does not have a parallax. Therefore, by relatively shifting the left image and the right image so that a shift amount of a specific corresponding point (the subject) where features match between the left image and the right image is zero, the parallax of the subject can be set at zero (the cross point CP can be matched with the distance of the subject).

When the 3D panorama image shooting mode is set, the main CPU 100 performs control so that the focus position, exposure condition, and white balance gain used for the first 3D image are fixed until shooting of a predetermined number of 3D images ends.

When the shooting of the preset number of 3D images necessary for 3D panorama synthesis ends, the main CPU 100 determines that the shooting of 3D images for 3D panorama synthesis has ended, and makes a transition to processes onward such as 3D panorama synthesis and others.

FIG. 4A to FIG. 4E are drawings that illustrate a process sequence of 3D panorama image synthesis.

In FIG. 4A, 1 to 6 denote images in time series shot during swinging of the stereoscopic imaging apparatus 1, and images on an upper side are left images and images on a lower side are right images.

The 3D image creating unit 117 functions as an image processing unit creating a 3D panorama image from the plurality of 3D images shot at the time of the 3D panorama image shooting mode. In a panorama synthesizing process, an optical flow calculated from corresponding points between images in time series detected by the corresponding point detecting unit 170. In the example illustrated in FIG. 4A, as an optical flow of 1-2, 2-3, 3-4, . . . between adjacent images (translation vectors), (x, y)=(19, 2), (21, −1), (20, 0), . . . are calculated.

Figure 4A:
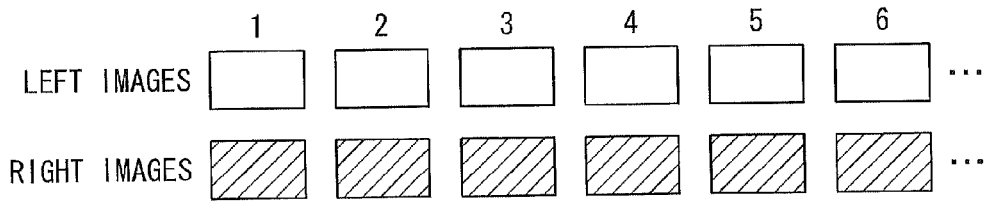
FIG. 4A is a drawing for describing 3D panorama synthesis and others.
Figure 4B:
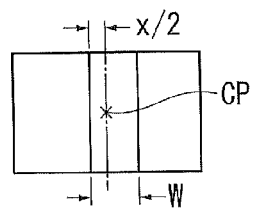
FIG. 4B is a drawing for describing the 3D panorama synthesis and others.
Figure 4C:
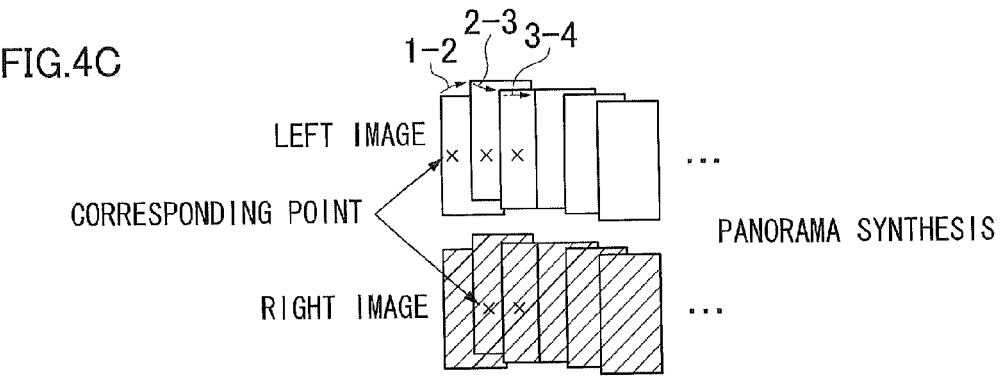
FIG. 4C is a drawing for describing the 3D panorama synthesis and others.
Figure 4D:
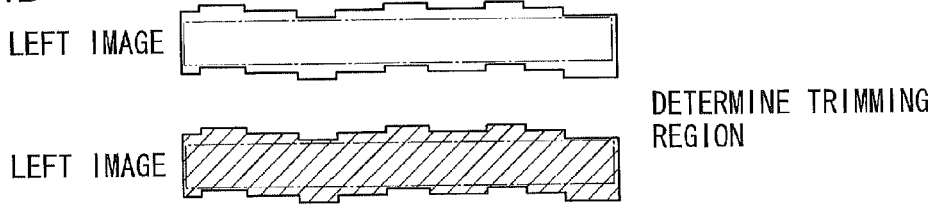
FIG. 4D is a drawing for describing the 3D panorama synthesis and others.

Subsequently, as illustrated in FIG. 4B, based on the calculated optical flow (translation vectors) of (x, y)=(19, 2), (21, −1), (20, 0), . . . , each 3D image is trimmed into strip shapes. Then, the trimmed strip-shaped slit images are sequentially synthesized. That is, strip-shaped slit images having a fixed width w from a position obtained by shifting the horizontal component x of the translation vector by ½ from the image center are cut out, and these cut-out strip-shaped slit images are synthesized as being shifted by the translation vectors in the vertical and horizontal directions, as illustrated in FIG. 4C. With this, 3D panorama synthesis is completed.

Next, images in a region having overlapping pixels of the left image and the right image subjected to panorama synthesis are each trimmed. In an example illustrated in FIG. 4D, an image in a maximum rectangular region is cut out from each of the left image and the right image subjected to panorama synthesis.

Figure 4E:
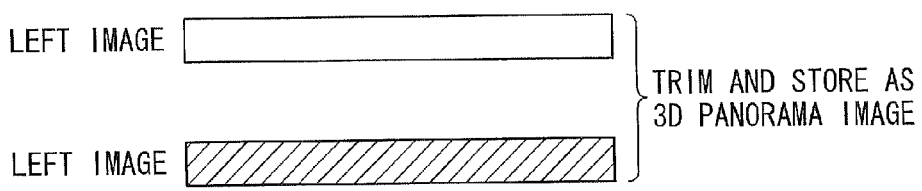
FIG. 4E is a drawing for describing the 3D panorama synthesis and others.

These cut-out left image and the right images are stored as a 3D panorama image in the memory card 161 (FIG. 4E). For example, a multipicture file (an MP file: a file in a format with a plurality of images coupled together) is generated from two left and right panorama images, and this MP file is recorded in the memory card 161 via the medium control unit 160. Note that the two left and right panorama images are not restricted to be stored in one MP file, but can be stored in separate image files as long as they are associated with each other.

Also, from among the corresponding points detected for each 3D image by the corresponding point detecting unit 170, the main CPU 100 specifies corresponding points near the center of the 3D image (for example, feature points in the strip-shaped slit images of the left images and corresponding points on the corresponding right images), and calculates a shift amount (the number of pixels) of these corresponding points as an image shift amount (hereinafter referred to as a CP amount).

That is, the main CPU 100 associates the CP amount for each 3D image calculated as described above and coordinates (x, y) of the cross point CP on the 3D panorama image (the left image), and records information about these as auxiliary information of the 3D panorama image in a header region of the MP file or the like.

FIG. 5 is a table illustrating an example of the auxiliary information having recorded thereon the CP amount (Ax) in association with the coordinates (x, y) of the cross point CP of each 3D image.

Figure 6:
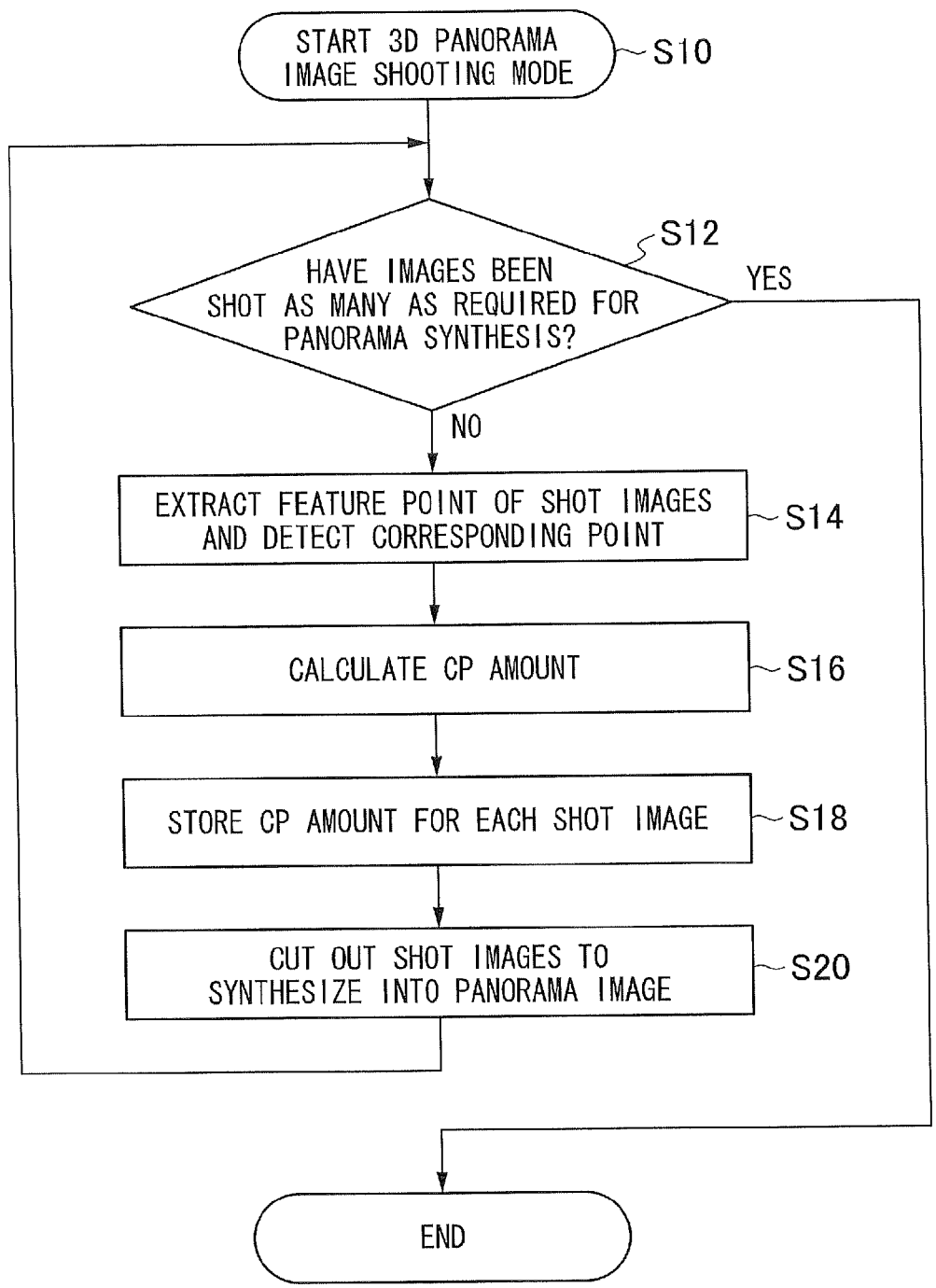
FIG. 6 is a flowchart illustrating an operating procedure of obtainment of 3D images for creating a 3D panorama image, and 3D panorama synthesis.

FIG. 6 is a flowchart illustrating an operating procedure of the above-described obtainment of 3D images for creating a 3D panorama image, and 3D panorama synthesis.

In FIG. 6, the 3D panorama image shooting mode is selected with the mode dial 10B of the operating unit 10, and then the stereoscopic imaging apparatus 1 is held by hand and shooting is started as the apparatus is being swung in a certain direction (step S10).

The main CPU 100 determines whether images have been shot as many as required for panorama synthesis (step S12). If shooting of the required number of images has ended (in the case of "Yes"), the main CPU 100 ends shooting in the 3D panorama image shooting mode. If shooting the required number of images has not ended (in the case of "No"), the main CPU 100 causes the procedure to make a transition to step S14.

At step S14, corresponding points are detected from the shot 3D images. That is, one feature point is extracted from a portion near the center of the left image of the 3D images is extracted, and a corresponding point of the right image corresponding to this feature point is detected. Subsequently, a CP amount which is a shift amount between the detected corresponding points, is calculated (step S16).

The calculated CP amount is stored for each obtained 3D image (step S18). Note that the CP amount is stored in association with the coordinates (x, y) of the cross point CP on the 3D panorama image (the left image), as illustrated in FIG. 5.

Also, as described with reference to FIG. 4A to FIG. 4E, from the shot 3D images, strip-shaped slit images are cut out based on the optical flow (the translation vectors) of preceding and subsequent 3D images, the strip-shaped slit images are synthesized (panorama synthesis) as being shifted by the translation vectors in vertical and horizontal directions, and then the procedure is caused to make a transition to step S12 (step S20).

By repeating the above-described step S12 to step S20 in the above-described manner for images required for panorama synthesis, a 3D panorama image is created and its auxiliary information (such as the CP amount) is calculated, and the 3D panorama image is stored in the memory card 161 together with the auxiliary information.

Note that calculation and storage of the CP amount and panorama image synthesis are performed for each 3D image shot during swinging of the stereoscopic imaging apparatus 1 in FIG. 6. However, the presently disclosed subject matter is not restricted to this. For example, 3D images as many as required for panorama synthesis may be shot, and these 3D images may be temporarily stored in the SDRAM 115, and then calculation of a CP amount, panorama synthesis, and others for each 3D image may be performed.

Reproduction of 3D Panorama Image

First Embodiment

Next, reproduction of the 3D panorama image stored in the memory card 161 in the manner described above is described.

FIG. 7 is a flowchart illustrating a first embodiment of a method of reproducing a 3D panorama image.

In FIG. 7, a 3D panorama image reproducing mode is selected with the mode dial 10B of the operating unit 10, and reproduction of a 3D panorama image is started (step S30). Note that at the start of reproducing a 3D panorama image, a predetermined 3D panorama image is read from the memory card 161, and is temporarily stored in the SDRAM 115. Also, in the first embodiment, it is assumed that the CP amount for each of a plurality of 3D images is stored as auxiliary information of the 3D panorama image as illustrated in FIG. 5.

First, from a left end of the read 3D panorama image, a 3D image for display having an aspect ratio equal to the aspect ratio of the screen of the liquid-crystal monitor DISP (FIG. 2) is cut out, and a CP amount of a center portion of the cut-out 3D image (at the center of the display screen of the liquid-crystal monitor DISP) is selected (step S32). In this CP amount selection, a position (an x coordinate) of a 3D panorama image (on the left image) of the center portion of the 3D image (a part of the 3D panorama image) to be displayed on the liquid-crystal monitor DISP is found, and a CP amount corresponding to the cross point CP having an x coordinate closest to that x coordinate is selected (refer to FIG. 5).

Subsequently, based on the selected CP amount, parallax adjustment is performed by shifting the right image from the left image by that CP amount, and the parallax-adjusted left and right images (3D images) are displayed on the liquid-crystal monitor DISP (step S34).

Then, it is determined whether an instruction for scrolling the 3D panorama image or an instruction for frame advance for each of a plurality of frames obtained by dividing the 3D panorama image has occurred (step S36). If an instruction for scrolling or an instruction for frame advance has occurred, the procedure is caused to make a transition to step S32. On the other hand, if neither an instruction for scrolling nor an instruction for frame advance has occurred in a predetermined period (that is, when display of the 3D panorama image to its right end has ended), reproduction of the read 3D panorama image is ended. Note that, by continuously generating instructions for scrolling at the time of reproduction by scrolling or instructions for frame advance at certain intervals at the time of reproduction by frame advance, reproduction by scrolling or reproduction by frame advance can be automatically performed.

When a CP amount corresponding to the next scroll position or the frame position is selected based on step S32, parallax adjustment is performed in a manner similar to that described above, based on the selected CP amount.

Figure 8A:
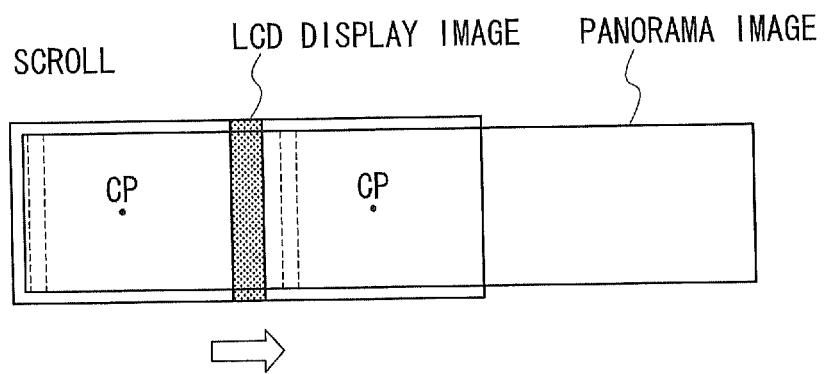
FIG. 8A is an image view when a 3D panorama image is reproduced by scrolling and frame advance.
Figure 8B:
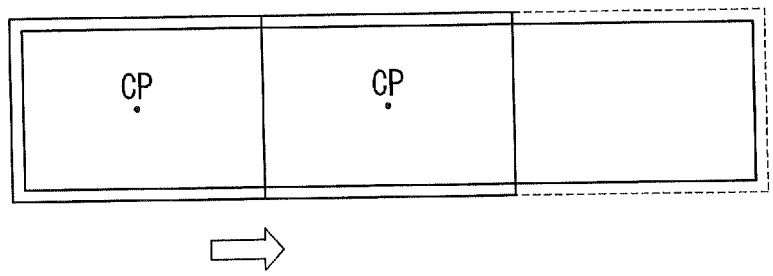
FIG. 8B is an image view when a 3D panorama image is reproduced by scrolling and frame advance.

FIG. 8A and FIG. 8B are image views when the 3D panorama image is reproduced by scrolling and by frame advance. In FIG. 8A and FIG. 8B, bold-line frames represent display images to be displayed on the liquid-crystal monitor DISP.

As illustrated in FIG. 8A, at the time of reproducing a 3D panorama image by scrolling, a CP amount near the screen center is selected for each scroll position of the 3D panorama image, thereby performing parallax adjustment. As illustrated in FIG. 8B, at the time of reproducing 3D panorama image by frame advance, a CP amount near the screen center is selected for each frame to be subjected to frame advance, thereby performing parallax adjustment.

Since parallax adjustment is performed based on the CP amount near the screen center at the time of reproducing a 3D panorama image by scrolling or by frame advance, the parallax of the image near the screen center can be set at zero. With this, the cross point portion (the portion without a parallax between left and right images), which significantly affects how the 3D image is viewed, is always near the screen center, thereby making stereoscopic viewing easy at the time of reproduction by scrolling or by frame advance.

Note that the 3D panorama image is automatically reproduced by scrolling or frame advance in the first embodiment described above. However, the presently disclosed subject matter is not restricted to this. For example, reproduction by scrolling or by frame advance may be performed with a manual operation of the cross key 10F of the operating unit 10. According to this, at the time of reproducing a 3D panorama image by scrolling or by frame advance, the 3D panorama image can be stopped at any scroll position or frame position.

Also, when reproduction by scrolling is performed with a manual operation, parallax adjustment id performed based on the CP amount immediately before the start of image feeding during scrolling. Then, when image feeding stops, parallax adjustment may be performed based on the CP amount near the stopping screen center. According to this, parallax adjustment during scrolling can be fixed, thereby reducing eye fatigue due to parallax fluctuations.

Also, only one image (a flat (2D) panorama image) between the left image and the right image is displayed on the liquid-crystal monitor DISP during scrolling and, when image feeding stops, parallax adjustment may be performed based on the CP amount near the stopping screen center.

Second Embodiment

Figure 9:
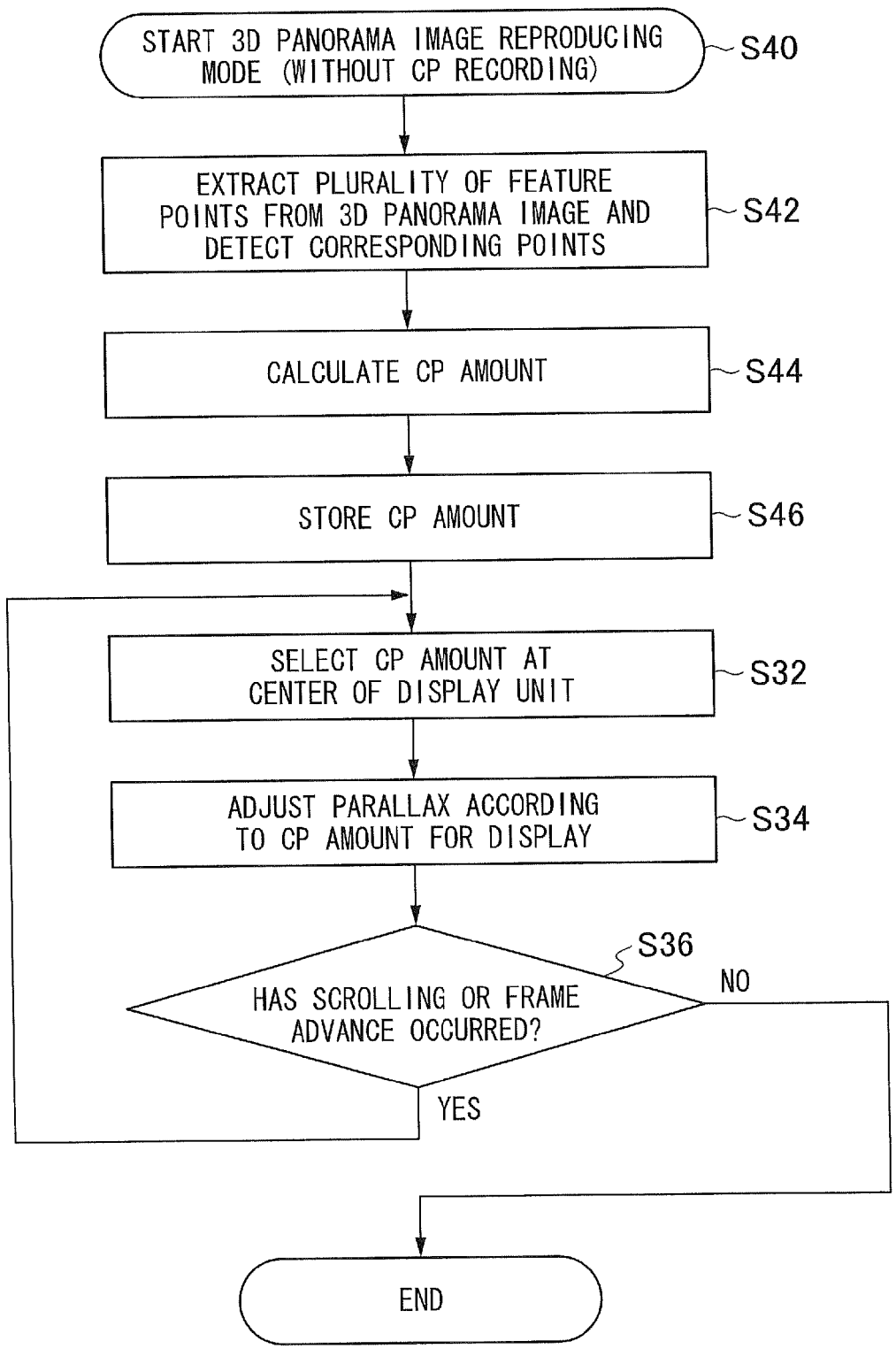
FIG. 9 is a flowchart illustrating a second embodiment of the method of reproducing a 3D panorama image.

FIG. 9 is a flowchart illustrating a second embodiment of the method of reproducing a 3D panorama image.

The second embodiment relates to a reproducing method when the CP amount is not stored as auxiliary information of the 3D panorama image. Note that portions common to those of the first embodiment illustrated in FIG. 7 are provided with the same step number and are not described in detail herein.

In FIG. 9, the 3D panorama image reproducing mode is selected with the mode dial 10B of the operating unit 10, and reproduction of a 3D panorama image is started (step S40). Note that, at the start of reproducing the 3D panorama image, a predetermined 3D panorama image is read from the memory card 161 is temporarily stored in the SDRAM 115, but no CP amount is stored.

In the second embodiment, prior to reproduction of the 3D panorama image, calculation of a CP amount and others are performed.

That is, a plurality of feature points are extracted from the 3D panorama image (the left image) read from the memory card 161, and corresponding points of the right image corresponding to these feature points are detected (step S42). Note that a plurality of feature points are extracted by dividing the 3D panorama image into regions with an approximately same width as that of the strip-shaped slit images at the time of creating the 3D panorama image, and extracting one feature point for each region obtained by division.

Subsequently, a CP amount, which is a shift amount between corresponding points detected at step S42, is calculated (step S44), and this calculated CP amount is stored in the SDRAM 115 in association of position coordinates of the plurality of feature points (step S46).

Then, the 3D panorama image is reproduced by scrolling or by frame advance by using the CP amount in a manner similar to that of the first embodiment illustrated in FIG. 7.

Note that after the end of reproducing the 3D panorama image, the CP amount temporarily stored in the SDRAM 115 may be recorded as auxiliary information on an MP file where the 3D panorama image is stored.

According to the second embodiment, even if a 3D panorama image with a CP amount not stored as auxiliary information of the 3D panorama image is inputted, the 3D panorama image parallax-adjusted for each scroll position or each frame advance can be reproduced by scrolling or by frame advance.

Third Embodiment

Figure 10:
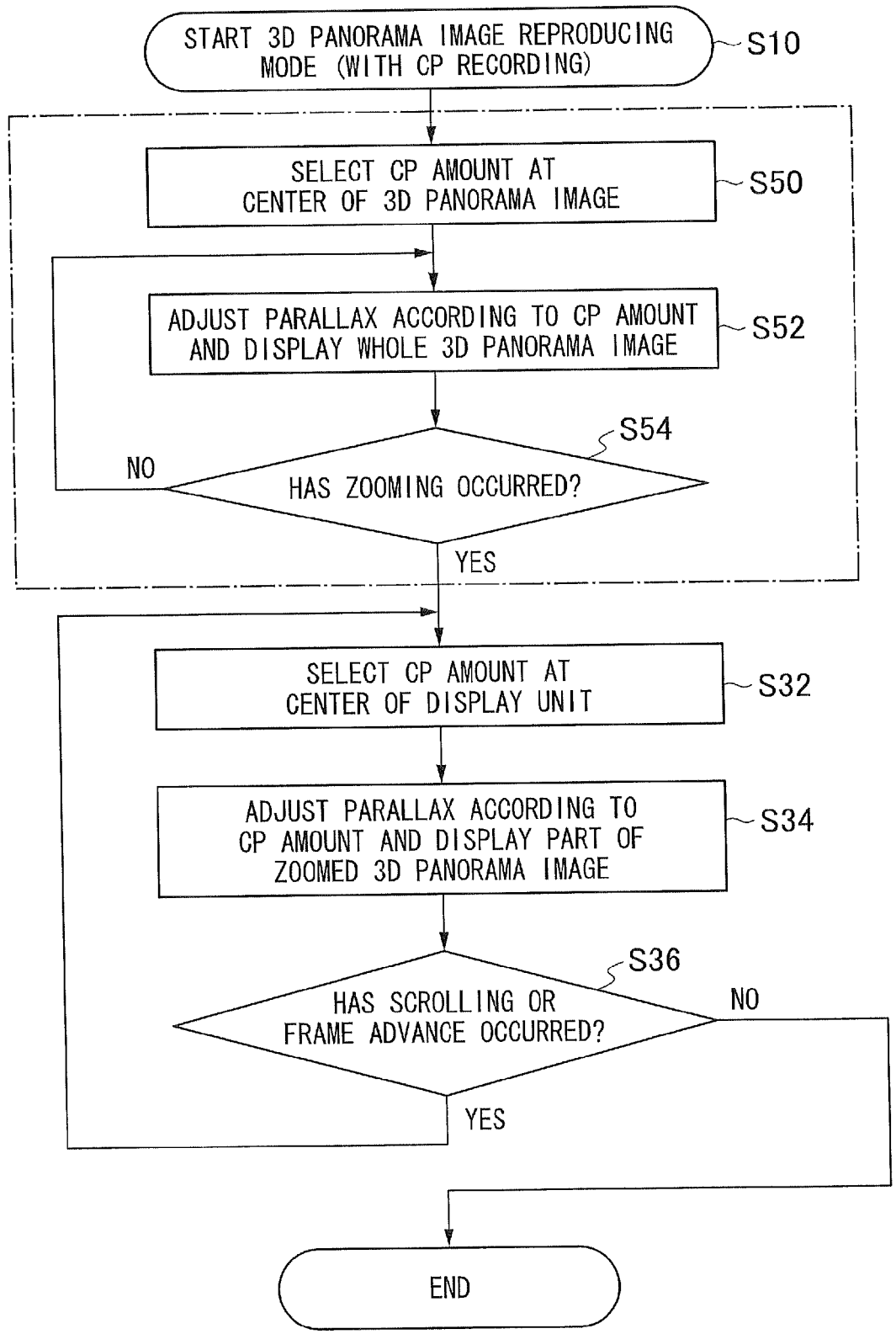
FIG. 10 is a flowchart illustrating a third embodiment of the method of reproducing a 3D panorama image.

FIG. 10 is a flowchart illustrating a third embodiment of the method of reproducing a 3D panorama image.

The third embodiment is obtained by modifying the first embodiment illustrated in FIG. 7 and is different from the first embodiment in that processes surrounded by a one-dot-chain line are added.

This third embodiment is different from the second embodiment in that the whole 3D panorama image is first displayed on the liquid-crystal monitor DISP.

In FIG. 10, when the 3D panorama image reproducing mode is selected with the mode dial 10B of the operating unit 10 and reproduction of a 3D panorama image is started (step S10), a CP amount at a center portion of the 3D panorama image read from the memory card 161 is selected (step S50).

Subsequently, based on the selected CP amount, parallax adjustment is performed by shifting the right image from the left image only by that CP amount, and the whole parallax-adjusted 3D panorama image is displayed on the liquid-crystal monitor DISP (step S52).

Figure 11:
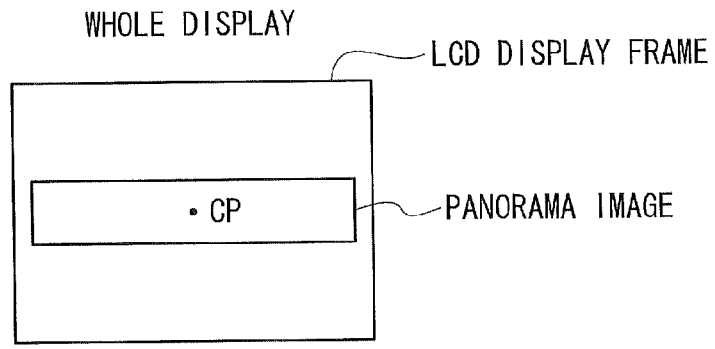
FIG. 11 is a drawing of a display screen of a liquid-crystal monitor displaying a whole 3D panorama image.

FIG. 11 is a drawing of a display screen of the liquid-crystal monitor DISP displaying the whole 3D panorama image.

Next, it is determined whether a zoom instruction for reproducing the 3D panorama image by scrolling or by frame advance or others has occurred (step S54). When no zoom instruction is present, the procedure is caused to make a transition to step S52, and then the whole 3D panorama image is displayed. If a zoom instruction has been present, the procedure is caused to make a transition to step S32. The zoom instruction may be automatically generated after a lapse of a predetermined time after the whole 3D panorama image is displayed, or may be generated based on an instruction input with the operating unit 10 of the user.

If a zoom instruction is generated and the procedure is caused to make a transition to step S32, the 3D panorama image is zoomed, and the 3D panorama image is reproduced by scrolling or by frame advance from a left end of the zoomed 3D panorama image (refer to FIG. 8A and the FIG. 8B). Note that when the 3D panorama image is reproduced by scrolling or by frame advance, as described in the first embodiment illustrated in FIG. 7, a CP amount is selected for each scroll position or each frame advance, and parallax adjustment is performed by using the selected CP amounts.

According to the third embodiment, after the whole 3D panorama image is recognized, and then the zoomed 3D panorama image can be viewed as being scrolled or being subjected to divided frame advance.

Note that the second embodiment illustrated in FIG. 9 may be modified so that, as with the third embodiment described above, the whole 3D panorama image is first displayed on the liquid-crystal monitor DISP. In this case, calculation of a CP amount and others can be performed during a period in which the whole 3D panorama image is being displayed on the liquid-crystal monitor DISP. Also, when the whole 3D panorama image is displayed on the liquid-crystal monitor DISP, parallax adjustment may be performed with a preset CP amount (including the CP amount=0).

Also, the zoom magnification at the time of reproducing the 3D panorama image by scrolling or by divided frame advance is preferably a magnification with which the width of the 3D panorama image in a longitudinal direction coincides with the width of the liquid-crystal monitor DISP in a longitudinal direction. However, the scope of the presently disclosed subject matter is not restricted to this magnification. For example, the magnification can be adjusted as appropriate with a manual zoom operation.

Other Embodiments of Calculation of CP Amount

In the embodiment illustrated in FIG. 6, a CP amount is calculated for each 3D image used for panorama synthesis from the corresponding points near the center of that 3D image. In another embodiment of calculation of a CP amount for the 3D panorama image, a plurality of main subjects are detected in a 3D panorama image, and a shift amount between left and right panorama images of each subject is calculated and taken as a CP amount.

As detecting means that detects main subjects, the face detecting unit 172 illustrated in FIG. 2 can be used. According to this, a CP amount is calculated from each face image included in the 3D panorama image, and the CP amount is stored in association with the position of each face image on the 3D panorama image (the left image).

Also, as main subjects in the 3D panorama image, in addition to a human face, artificial constructions such as a building and a wall and natural objects such as a wood and a forest can be thought. These artificial constructions and natural objects such as a wood and a forest can be detected by a known object recognition technology (for example, matching against dictionary data for each object).

Therefore, by providing object detecting means (including the face detecting unit 172) to the stereoscopic imaging apparatus 1, a CP amount can be calculated for each of the main subjects (objects such as a face, an artificial construction, and a natural object) can be calculated and stored.

Fourth Embodiment

Figure 12:
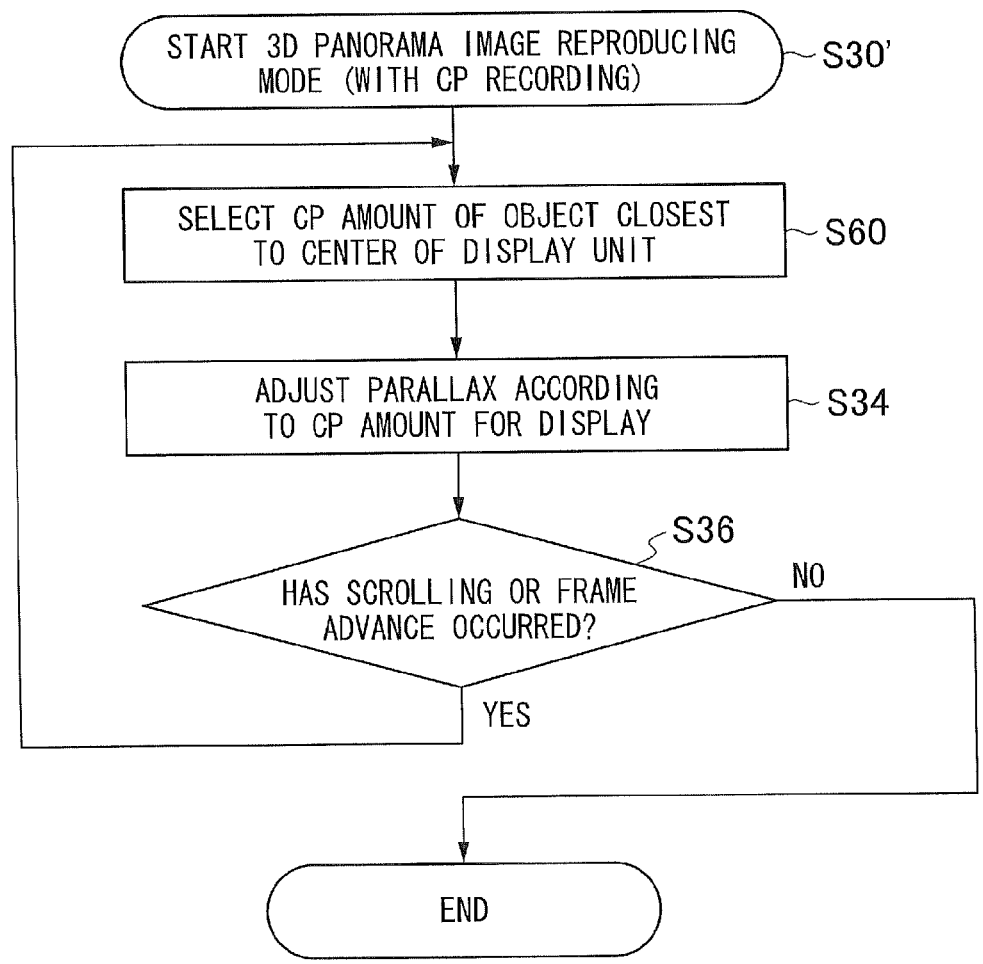
FIG. 12 is a flowchart illustrating a fourth embodiment of the method of reproducing a 3D panorama image.

FIG. 12 is a flowchart illustrating a fourth embodiment of the method of reproducing a 3D panorama image. Note that portions common to those of the first embodiment illustrated in FIG. 7 are provided with the same step number and are not described in detail herein.

In FIG. 12, the 3D panorama image reproducing mode is selected with the mode dial 10B of the operating unit 10, and reproduction of a 3D panorama image is started (step S30'). Note that, at the start of reproducing the 3D panorama image, a predetermined 3D panorama image is read from the memory card 161 and is temporarily stored in the SDRAM 115. Also, in the fourth embodiment, it is assumed that a CP amount is stored for each object in the 3D panorama image as auxiliary information of the 3D panorama image.

When reproduction of the 3D panorama image is started, a CP amount corresponding to an object closest to the center of the display unit in the 3D image (part of the 3D panorama image) displayed on the liquid-crystal monitor DISP (FIG. 2) is selected (step S60).

Then, the 3D panorama image parallax-adjusted with the CP amount is reproduced by scrolling or by frame advance in a manner similar to that of the first embodiment illustrated in FIG. 7.

According to the fourth embodiment, when the 3D panorama image is reproduced by scrolling or by frame advance, parallax adjustment is performed so that the object closest to the center of the display unit coincides with the cross point. For this reason, the objects (the main subjects) in the 3D panorama image can be stereoscopically viewed easily at the time of reproduction by scrolling or by frame advance.

Note that the CP amount corresponding to the object closest to the center of the display unit of the liquid-crystal monitor DISP is selected in the fourth embodiment. However, the presently disclosed subject matter is not restricted to this. For example, a priority level may be determined in advance (for example, in an order of face→building→others) for each type of object and, when a plurality of objects of different types are present in the display screen, the CP amount corresponding to the object with the highest priority level may be selected. In this case, information about the types of object is also required to be stored in association with the CP amounts.

Other Embodiments of Obtainment of 3D Images for 3D Panorama Image and 3D Panorama Synthesis As illustrated in FIG. 3 and FIG. 4A to FIG. 4E, to shoot 3D images for 3D panorama synthesis, the stereoscopic imaging apparatus 1 is swung in a constant direction and is caused to perform continuous shooting (consecutive shooting). However, the presently disclosed subject matter is not restricted to this. For example, shooting may be performed as illustrated in FIG. 13A and FIG. 13B.

Figure 13A:
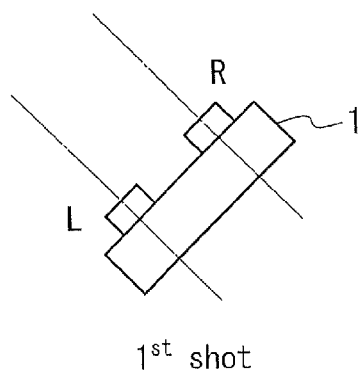
FIG. 13A is a drawing of another method of shooting 3D images for 3D panorama synthesis.
Figure 13B:
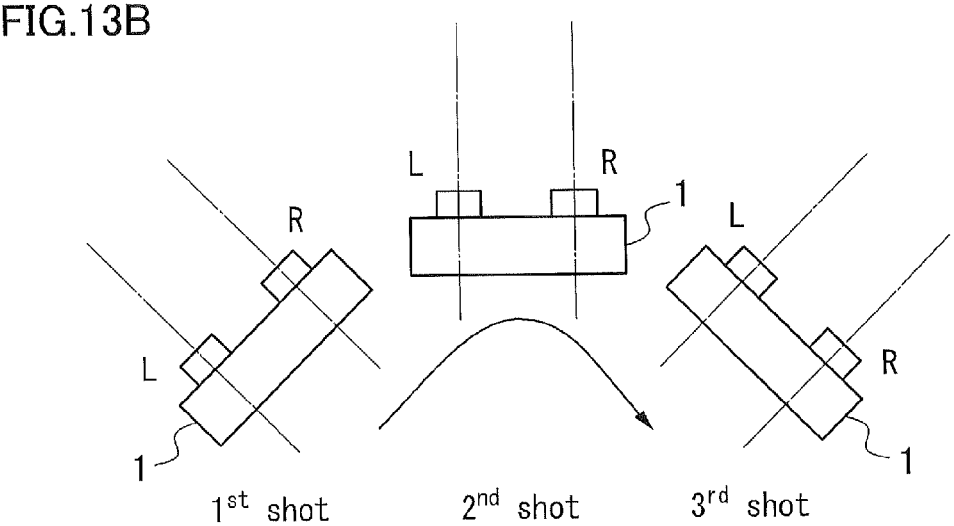
FIG. 13B is a drawing of still another method of shooting 3D images for 3D panorama synthesis.

That is, as illustrated in FIG. 13A and FIG. 13B, the first 3D image is shot by the stereoscopic imaging apparatus 1 (FIG. 13A). When the 3D panorama image shooting mode is set, the main CPU 100 performs control so that the focus position, exposure condition, and white balance gain used for the first 3D image are fixed until the following shooting of the predetermined number of 3D images ends.

When shooting of the first 3D image ends, the photographer swings (pans) the stereoscopic imaging apparatus 1 to change the shooting direction to shoot the second 3D image (FIG. 13B).

Figure 14:
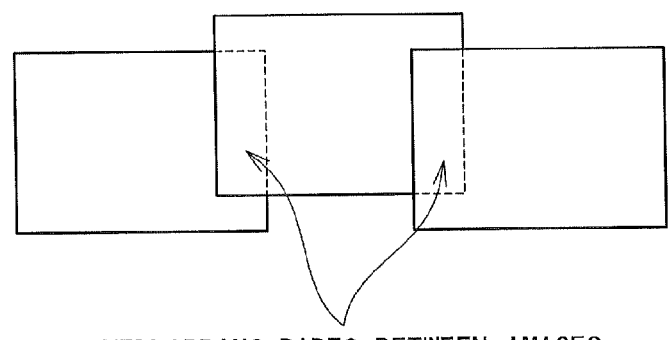
FIG. 14 is a drawing for describing matching of an angle of view at the time of shooting 3D images for 3D panorama synthesis.

Here, as illustrated in FIG. 14, the photographer performs shooting by adjusting the shooting direction of the stereoscopic imaging apparatus 1 so that the first 3D image and the second 3D image partially overlap each other. At the time of the 3D panorama image shooting mode, the main CPU 100 preferably causes part of the previously-shot 3D image to be displayed on the liquid-crystal monitor DISP to assist the shooting direction at the next shooting. That is, the photographer can determine a shooting direction by viewing part of the 3D image previously shot and displayed on the liquid-crystal monitor DISP and a through-the-lens image.

When shooting of the preset or default-set number of 3D images ends, the main CPU 100 determines that shooting of the 3D images for 3D panorama synthesis has ended, and causes the procedure to make a transition to the following processes of 3D panorama synthesis. Note that any known technology can be used as the panorama synthesizing method of synthesis for a 3D panorama image from a plurality of 3D image images obtained as described above.

Others

In the embodiment illustrated in FIG. 6, one feature point near the center of the left image is extracted for each of the continuously obtained 3D images, and a corresponding point of the right image corresponding to this feature point is detected. From a shift amount between these detected corresponding points, a CP amount is calculated. However, depending on the shooting scene, a feature point suitable for detecting a corresponding point in a region near the center of the left image cannot be extracted in some cases. In this case, a preset CP amount (including the CP amount=0), a CP amount found by interpolation between adjacent CP amounts, or the like is taken as the CP amount for that 3D image.

Also, when the 3D panorama image is reproduced by scrolling, in order to allow parallax adjustment for each scroll position, a CP amount corresponding to each scroll position may be found by interpolation (linear interpolation) based on the calculated plurality of CP amounts, and these CP amounts may be also recorded.

Furthermore, also when a CP amount is calculated for each object in the 3D panorama image, a CP amount between objects may be found by interpolation computation and these CP amounts may be recorded.

Still further, in the present embodiment, a CP amount (an image shift amount) with which a shift amount of a specific corresponding point (a subject) where features match between the left image and the right image is zero is found. However, the presently disclosed subject matter is not restricted to the case where the shift amount of the corresponding point is set at zero. For example, an image shift amount can be found so as to achieve a predetermined parallax amount (a parallax amount with which the target subject is slightly popped up forward). Still further, this predetermined parallax amount can be set as appropriate by the user.

By finding the CP amount for each scroll amount by interpolation as described above, when the 3D panorama image is reproduced by scrolling, the CP amounts obtained by the interpolation computation can be used to continuously perform parallax adjustment.

Also, while this stereoscopic imaging apparatus 1 causes the 3D panorama image to be displayed on the liquid-crystal monitor DISP on the rear surface, the apparatus 1 may include an output interface for causing the 3D panorama image to be displayed on an external 3D display.

Furthermore, the 3D panorama image creating apparatus and the 3D panorama image reproducing apparatus may be configured from a device such as a personal computer without a shooting function. In this case, a plurality of 3D images for 3D panorama synthesis shot by a general stereoscopic imaging apparatus are taken as input images.

Still further, by installing the panorama image creating program and the panorama image reproducing program according to the presently disclosed subject matter on a computer via a recording medium having the program stored therein, the computer may be made to function as a 3D panorama image creating apparatus or a 3D panorama image reproducing apparatus.

Also, the presently disclosed subject matter is not restricted to the embodiments described above, and can be variously modified, such as by combining the embodiments as appropriate, within a range not deviating from the spirit of the presently disclosed subject matter.

What is claimed is:
1. A stereoscopic panorama image creating apparatus, comprising:
 a stereoscopic image obtaining unit configured to obtain a plurality of stereoscopic images formed of left images and right images shot by a stereoscopic imaging apparatus, the stereoscopic images continuously shot with the stereoscopic imaging apparatus being swung in a constant direction;
 a stereoscopic panorama image creating unit configured to create a stereoscopic panorama image formed of left and right panorama images by synthesizing the left images together and synthesizing the right images together from among the plurality of stereoscopic images obtained by the stereoscopic image obtaining unit;
 a corresponding point detecting unit configured to detect a plurality of corresponding points for parallax adjustment, the corresponding points having features matched between the left images and the right images of the plurality of stereoscopic images obtained by the stereoscopic image obtaining unit or between the left and right panorama images of the created stereoscopic panorama image;
 an image shift amount calculating unit configured to calculate a plurality of image shift amounts for setting parallaxes of the detected plurality of corresponding points each at a predetermined parallax amount; and
 a recording unit configured to record the created stereoscopic panorama image in a recording medium, the recording unit configured to record position information of the plurality of corresponding points for parallax adjustment on the stereoscopic panorama image and the calculated plurality of image shift amounts as being associated with each other in the recording medium as auxiliary information of the stereoscopic panorama image;
 a reading unit configured to read a stereoscopic panorama image and auxiliary information of the stereoscopic panorama image from the recording medium;
 a reproducing unit configured to cause the read stereoscopic panorama image to be magnified with a predetermined magnification, the reproducing unit configured to cause the magnified stereoscopic panorama image to be reproduced by scrolling on a stereoscopic display or reproduced by frame advance for each of a plurality of frames obtained by dividing the stereoscopic panorama image, automatically or with a manual instruction input; and
 a parallax adjusting unit configured to select one image shift amount from among a plurality of image shift amounts recorded as the auxiliary information of the stereoscopic panorama image, the image shift amount corresponding to a stereoscopic image in a screen of the stereoscopic display, the parallax adjusting unit configured to perform a parallax adjustment of the stereoscopic image based on the selected image shift amount, when the stereoscopic panorama image is reproduced by scrolling or frame advance by the reproducing unit.

2. The stereoscopic panorama image creating apparatus according to claim 1, wherein
 the corresponding point detecting unit detects a set of corresponding points for each set of the left image and the right image of each of the stereoscopic images obtained by the stereoscopic image obtaining unit, and the image shift amount calculating unit calculates the image shift amounts each for setting a parallax between the detected corresponding points at the predetermined parallax amount.

3. The stereoscopic panorama image creating apparatus according to claim 2, wherein
the corresponding point detecting unit detects the set of corresponding points for each set of the left image and the right image of each of the stereoscopic images in a portion near a center of the stereoscopic image.

4. The stereoscopic panorama image creating apparatus according to claim 3, wherein
when necessary corresponding points are not detected by the corresponding point detecting unit in the portion near the center of the stereoscopic image, the image shift amount calculating unit sets image shift amounts set in advance as calculation values or calculates the image shift amounts by interpolation between adjacent image shift amounts.

5. The stereoscopic panorama image creating apparatus according to claim 1, wherein
the stereoscopic panorama image creating unit creates the stereoscopic panorama image by piecing slit images each in a strip shape together, the slit images being in a portion near a center from among the plurality of stereoscopic images obtained by the stereoscopic image obtaining unit.

6. The stereoscopic panorama image creating apparatus according to claim 1, further comprising
an object detecting unit configured to detect a necessary object included in the plurality of stereoscopic images obtained by the stereoscopic image obtaining unit or the created stereoscopic panorama image, wherein
the corresponding point detecting unit detects a corresponding point for each object detected by the object detecting unit.

7. The stereoscopic panorama image creating apparatus according to claim 1, further comprising
an interpolation computing unit configured to calculate continuous pixel shift amounts by interpolating pixel shift amounts between the corresponding points based on the plurality of image shift amounts calculated by the image shift amount calculating unit, wherein
the recording unit records the plurality of image shift amounts calculated by the image shift amount calculating unit and the pixel shift amounts calculated by the interpolation computing unit in the recording medium.

8. The stereoscopic panorama image creating apparatus according to claim 1, wherein
the predetermined parallax amount is zero.

9. The stereoscopic panorama image reproducing apparatus according to claim 1, wherein
the parallax adjusting unit selects the image shift amount at a center of a screen of the stereoscopic display or in a portion closest to the center of the screen, and performs a parallax adjustment of the stereoscopic image based on the selected image shift amount.

10. The stereoscopic panorama image reproducing apparatus according to claim 1, wherein
when the reproducing unit reproduces the stereoscopic panorama image by scrolling with a manual instruction input, the parallax adjusting unit selects one image shift amount corresponding to a stereoscopic image displayed in a screen of the stereoscopic display at a time of starting the scrolling with the manual instruction input by a time of stopping scrolling and, when the scrolling is stopped, selects one image shift amount corresponding to a stereoscopic image displayed in the screen of the stereoscopic displayed at the time of stopping scrolling, and performs a parallax adjustment of the stereoscopic images based on the selected image shift amounts.

11. The stereoscopic panorama image reproducing apparatus according to claim 1, wherein
the reproducing unit causes only one of the left image and the right image to be displayed on the stereoscopic display during scrolling by reproduction by scrolling with a manual instruction input, and causes the stereoscopic image to be displayed on the stereoscopic display when the scrolling is stopped, and
at a time of stopping scrolling, the parallax adjusting unit selects one image shift amount corresponding to the stereoscopic image displayed in a screen of the stereoscopic display at the time of stopping scrolling, and performs a parallax adjustment of the stereoscopic image based on the selected image shift amount.

12. The stereoscopic panorama image reproducing apparatus according to claim 1, wherein
the reproducing unit causes a whole of the stereoscopic panorama image to be displayed on the stereoscopic displayed, and then causes the stereoscopic panorama image to be magnified with a predetermined magnification and replayed by scrolling or frame advance.

13. A stereoscopic panorama image reproducing apparatus, comprising:
a stereoscopic panorama image obtaining unit configured to obtain a stereoscopic panorama image formed of left and right panorama images;
corresponding point detecting unit configured to detect, prior to reproduction of the obtained stereoscopic panorama image, a plurality of corresponding points for parallax adjustment in the stereoscopic panorama image, the corresponding points having features matched between the left and right panorama images;
an image shift amount calculating unit configured to calculate image shift amounts for setting parallaxes of the detected plurality of corresponding points each at a predetermined parallax amount;
a storage unit configured to store position information of the plurality of corresponding points for parallax adjustment on the stereoscopic panorama image and the calculated plurality of image shift amounts as being associated with each other;
a reproducing unit configured to cause the obtained stereoscopic panorama image to be magnified with a predetermined magnification, the reproducing, unit configured to cause the magnified stereoscopic panorama image to be reproduced by scrolling on a stereoscopic display or reproduced by frame advance for each of a plurality of frames obtained by dividing the stereoscopic panorama image, automatically or with a manual instruction input; and
a parallax adjusting unit configured to select one image shift amount from among a plurality of image shift amounts stored in the storage unit correspondingly to the stereoscopic panorama image, the image shift amount corresponding to a stereoscopic image in a screen of the stereoscopic display, the parallax adjusting unit configured to perform a parallax adjustment of the stereoscopic image based on the selected image shift amount, when the stereoscopic panorama image is reproduced by scrolling or frame advance by the reproducing unit.

14. The stereoscopic panorama image reproducing apparatus according to claim 13, wherein the corresponding point detecting unit detects one set of corresponding points for each of slit images each in a strip shape obtained by dividing the panorama image.

15. The stereoscopic panorama image reproducing apparatus according to claim 14, wherein when necessary corresponding points are not detected by the corresponding point detecting unit in a portion near a center of the stereoscopic image, the image shift amount calculating unit sets image shift amounts set in advance as calculation values or calculates the image shift amounts by interpolation between adjacent image shift amounts.

16. The stereoscopic panorama image reproducing apparatus according to claim 13, further comprising an object detecting unit configured to detect a necessary object included in the obtained stereoscopic panorama image, wherein the corresponding point detecting unit detects a corresponding point for each object detected by the object detecting unit.

17. The stereoscopic panorama image reproducing apparatus according to claim 13, further comprising an interpolation computing unit configured to calculate continuous pixel shift amounts by interpolating pixel shift amounts between the corresponding points based on the plurality of image shift amounts calculated by the image shift amount calculating unit, wherein the storage unit stores the plurality of image shift amounts calculated by the image shift amount calculating unit and the pixel shift amounts calculated by the interpolation computing unit.

18. The stereoscopic panorama image reproducing apparatus according to claim 13, wherein the predetermined parallax amount is zero.

19. A stereoscopic panorama image creating method, comprising:

a stereoscopic image obtaining step of obtaining a plurality of stereoscopic images formed of left images and right images shot by a stereoscopic imaging apparatus, the stereoscopic images continuously shot with the stereoscopic imaging apparatus being swung in a constant direction;

a stereoscopic panorama image creating step of creating a stereoscopic panorama image formed of left and right panorama images by synthesizing the left images together and synthesizing the right images together from among the obtained plurality of stereoscopic images;

a corresponding point detecting step of detecting a plurality of corresponding points for parallax adjustment, the corresponding points having features matched between the left images and the right images of the obtained plurality of stereoscopic images or between the left and right panorama images of the created stereoscopic panorama image;

an image shift amount calculating step of calculating image shift amounts for setting parallaxes of the detected plurality of corresponding points each at a predetermined parallax amount; and a recording step of recording the created stereoscopic panorama image in a recording medium and recording position information of the plurality of corresponding points for parallax adjustment on the stereoscopic panorama image and the calculated plurality of image shift amounts as being associated with each other in the recording medium as auxiliary information of the stereoscopic panorama image;

a reading step of reading a stereoscopic panorama image and auxiliary information of the stereoscopic panorama image from the recording medium;

a reproducing step of causing the read stereoscopic panorama image to be magnified with a predetermined magnification and causing the magnified stereoscopic panorama image to be reproduced by scrolling on a stereoscopic display or reproduced by frame advance for each of a plurality of frames obtained by dividing the stereoscopic panorama image, automatically or with a manual instruction input; and a parallax adjusting step of selecting one image shift amount from among a plurality of image shift amounts recorded as the auxiliary information of the stereoscopic panorama image, the image shift amount corresponding to a stereoscopic image in a screen of the stereoscopic display, and performing a parallax adjustment of the stereoscopic image based on the selected image shift amount, when the stereoscopic panorama image is reproduced by scrolling or frame advance in the reproducing step.

20. The stereoscopic panorama image creating method according to claim 19, wherein in the corresponding point detecting step, a set of corresponding points for each set of the left image and the right image of each of the obtained stereoscopic images is detected, and, in the image shift amount calculating step, one set of corresponding points is specified from among the corresponding points detected for each of the stereoscopic images, and the image shift amounts each for setting a parallax between the corresponding points at the predetermined parallax amount are calculated.

21. The stereoscopic panorama image creating method according to claim 20, wherein in the corresponding point detecting step, the set of corresponding points for each set of the left image and the right image of each of the stereoscopic images is detected in a portion near a center of the stereoscopic image.

22. The stereoscopic panorama image creating method according to claim 21, wherein when necessary corresponding points are not detected in the corresponding point detecting step in the portion near the center of the stereoscopic image, image shift amounts set in advance are set as calculation values or the image shift amounts are calculated by interpolation between adjacent image shift amounts in the image shift amount calculating step.

23. The stereoscopic panorama image creating method according to claim 19, wherein in the stereoscopic panorama image creating step, the stereoscopic panorama image is created by piecing slit images each in a strip shape together, the slit images being in a portion near a center from among the obtained plurality of stereoscopic images.

24. The stereoscopic panorama image creating method according to claim 19, further comprising an object detecting step of detecting a necessary object included in the obtained plurality of stereoscopic images or the created stereoscopic panorama image, wherein in the corresponding point detecting step, a corresponding point for each object detected by the object detecting step is detected.

25. The stereoscopic panorama image creating method according to claim 19, further comprising an interpolation computing step of calculating continuous pixel shift amounts by interpolating pixel shift amounts between the corresponding points based on the plurality of image shift amounts calculated in the image shift amount calculating step, wherein in the recording step, the plurality of image shift amounts calculated in the image shift amount calculating step and the pixel shift amounts calculated in the interpolation computing step are recorded in the recording medium.

26. The stereoscopic panorama image creating method according to claim 19, wherein the predetermined parallax amount is zero.

27. The stereoscopic panorama image reproducing method according to claim 19, wherein in the parallax adjusting step, the image shift amount at a center of a screen of the stereoscopic display or in a portion closest to the center of the screen is selected, and a parallax adjustment of the stereoscopic image is performed based on the selected image shift amount.

28. The stereoscopic panorama image reproducing method according to claim 19, wherein when the stereoscopic panorama image is reproduced by scrolling with a manual instruction input in the reproducing step, one image shift amount corresponding to a stereoscopic image displayed in a screen of the stereoscopic display at a time of starting the scrolling with the manual instruction input is selected by a time of stopping scrolling and, when the scrolling is stopped, one image shift amount corresponding to a stereoscopic image displayed in the screen of the stereoscopic displayed at the time of stopping scrolling is selected, and a parallax adjustment of the stereoscopic images is performed based on the selected image shift amounts, in the parallax adjusting step.

29. The stereoscopic panorama image reproducing method according to claim 19, wherein the reproducing step causes only one of the left image and the right image to be displayed on the stereoscopic display during scrolling by reproduction by scrolling with a manual instruction input, and causes the stereoscopic image to be displayed on the stereoscopic display when the scrolling is stopped, and in the parallax adjusting step, at a time of stopping scrolling, one image shift amount corresponding to the stereoscopic image displayed in a screen of the stereoscopic display at the time of stopping scrolling is selected, and a parallax adjustment of the stereoscopic image is performed based on the selected image shift amount.

30. The stereoscopic panorama image reproducing method according to claim 19, wherein the reproducing step causes a whole of the stereoscopic panorama image to be displayed on the stereoscopic displayed, and then causes the stereoscopic panorama image to be magnified with a predetermined magnification and replayed by scrolling or frame advance.

31. A stereoscopic panorama image reproducing method, comprising:

a stereoscopic panorama image obtaining step of obtaining a stereoscopic panorama image formed of left and right panorama images;

a corresponding point detecting step of detecting, prior to reproduction of the obtained stereoscopic panorama image, a plurality of corresponding points for parallax adjustment in the stereoscopic panorama image, the corresponding points having features matched between the left and right panorama images;

an image shift amount calculating step of calculating image shift amounts for setting parallaxes of the detected plurality of corresponding points each at a predetermined parallax amount;

a storing step of storing position information of the plurality of corresponding points for parallax adjustment on the stereoscopic panorama image and the calculated plurality of image shift amounts as being associated with each other;

a reproducing step of causing the obtained stereoscopic panorama image to be magnified with a predetermined magnification and causing the magnified stereoscopic panorama image to be reproduced by scrolling on a stereoscopic display or reproduced by frame advance for each of a plurality of frames obtained by dividing the stereoscopic panorama image, automatically or with a manual instruction input; and a parallax adjusting step of selecting one image shift amount from among a plurality of image shift amounts stored in a storage unit correspondingly to the stereoscopic panorama image, the image shift amount corresponding to a stereoscopic image in a screen of the stereoscopic display, and performing a parallax adjustment of the stereoscopic image based on the selected image shift amount, when the stereoscopic panorama image is reproduced by scrolling or frame advance in the reproducing step.

32. The stereoscopic panorama image reproducing method according to claim 31, wherein in the corresponding point detecting step, one set of corresponding points for each of slit images each in a strip shape obtained by dividing the panorama image is detected.

33. The stereoscopic panorama image reproducing method according to claim 32, wherein when necessary corresponding points are not detected in the corresponding point detecting step in a portion near a center of the stereoscopic image, image shift amounts set in advance are set as calculation values, or the image shift amounts are calculated by interpolation between adjacent image shift amounts in the image shift amount calculating step.

34. The stereoscopic panorama image reproducing method according to claim 31, further comprising an object detecting step of detecting a necessary object included in the obtained stereoscopic panorama image, wherein in the corresponding point detecting step, a corresponding point for each object detected in the object detecting step is detected.

35. The stereoscopic panorama image reproducing method according to claim 31, further comprising an interpolation computing step of calculating continuous pixel shift amounts by interpolating pixel shift amounts between the corresponding points based on the plurality of image shift amounts calculated in the image shift amount calculating step, wherein in the storing step, the plurality of image shift amounts calculated in the image shift amount calculating step and the pixel shift amounts calculated in the interpolation computing step are stored.

36. The stereoscopic panorama image reproducing method according to claim 31, wherein the predetermined parallax amount is zero.

37. A non-transitory computer-readable recording medium having instruction stored thereon causing, when the instruction is read by a processor and executed, the processor to achieve:
- a stereoscopic image obtaining step of obtaining a plurality of stereoscopic images formed of left images and right images shot by a stereoscopic imaging apparatus, the stereoscopic images continuously shot with the stereoscopic imaging apparatus being swung in a constant direction;
- a stereoscopic panorama image creating step of creating a stereoscopic panorama image formed of left and right panorama images by synthesizing the left images together and synthesizing the right images together from among the plurality of stereoscopic images obtained in the stereoscopic image obtaining step;
- a corresponding point detecting step of detecting a plurality of corresponding points for parallax adjustment, the corresponding points having features matched between the left images and the right images of the plurality of stereoscopic images obtained in the stereoscopic image obtaining step or between the left and right panorama images of the created stereoscopic panorama image;
- an image shift amount calculating step of calculating a plurality of image shift amounts for setting parallaxes of the detected plurality of corresponding points each at a predetermined parallax amount; and
- a recording step of recording the created stereoscopic panorama image in a recording medium and recording position information of the plurality of corresponding points for parallax adjustment on the stereoscopic panorama image and the calculated plurality of image shift amounts as being associated with each other in the recording medium as auxiliary information of the stereoscopic panorama image;
- a reading step of reading a stereoscopic panorama image and auxiliary information of the stereoscopic panorama image from the recording medium;
- a reproducing step of causing the read stereoscopic panorama image to be magnified with a predetermined magnification and causing the magnified stereoscopic panorama image to be reproduced by scrolling on a stereoscopic display or reproduced by frame advance for each of a plurality of frames obtained by dividing the stereoscopic panorama image, automatically or with a manual instruction input; and
- a parallax adjusting step of selecting one image shift amount from among a plurality of image shift amounts recorded as the auxiliary information of the stereoscopic panorama image, the image shift amount corresponding to a stereoscopic image in a screen of the stereoscopic display, and performing a parallax adjustment of the stereoscopic image based on the selected image shift amount, when the stereoscopic panorama image is reproduced by scrolling or frame advance in the reproducing step.

38. A non-transitory computer-readable recording medium having instruction stored thereon causing, when the instruction is read by a processor and executed, the processor to achieve:
- a stereoscopic panorama image obtaining step of obtaining a stereoscopic panorama image formed of left and right panorama images;
- a corresponding point detecting step of detecting, prior to reproduction of the obtained stereoscopic panorama image, a plurality of corresponding points for parallax adjustment in the stereoscopic panorama image, the corresponding points having features matched between the left and right panorama images;
- an image shift amount calculating step of calculating image shift amounts for setting parallaxes of the detected plurality of corresponding points each at a predetermined parallax amount;
- a storing step of storing position information of the plurality of corresponding points for parallax adjustment on the stereoscopic panorama image and the calculated plurality of image shift amounts as being associated with each other;
- a reproducing step of causing the obtained stereoscopic panorama image to be magnified with a predetermined magnification and causing the magnified stereoscopic panorama image to be reproduced by scrolling on a stereoscopic display or reproduced by frame advance for each of a plurality of frames obtained by dividing the stereoscopic panorama image, automatically or with a manual instruction input; and
- a parallax adjusting step of selecting one image shift amount from among a plurality of image shift amounts stored in the storing step correspondingly to the stereoscopic panorama image, the image shift amount corresponding to a stereoscopic image in a screen of the stereoscopic display, and performing parallax adjustment of the stereoscopic image based on the selected image shift amount, when the stereoscopic panorama image is reproduced by scrolling or frame advance in the reproducing step.

* * * * *